(12) United States Patent
Tokuchi et al.

(10) Patent No.: US 8,372,517 B2
(45) Date of Patent: Feb. 12, 2013

(54) ACRYLIC THERMOPLASTIC RESIN COMPOSITION, ACRYLIC RESIN FILM AND ACRYLIC RESIN COMPOSITE

(75) Inventors: Kazuki Tokuchi, Kurashiki (JP);
Nobuhiro Moriguchi, Kurashiki (JP);
Yohei Kamata, Kurashiki (JP);
Yukiatsu Komiya, Chiyoda-ku (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 483 days.

(21) Appl. No.: 12/446,642

(22) PCT Filed: Oct. 23, 2007

(86) PCT No.: PCT/JP2007/070597
§ 371 (c)(1),
(2), (4) Date: Apr. 22, 2009

(87) PCT Pub. No.: WO2008/050738
PCT Pub. Date: May 2, 2008

(65) Prior Publication Data
US 2010/0015400 A1 Jan. 21, 2010

(30) Foreign Application Priority Data

| Oct. 23, 2006 | (JP) | 2006-287745 |
| Mar. 27, 2007 | (JP) | 2007-081872 |
| Mar. 30, 2007 | (JP) | 2007-090863 |

(51) Int. Cl.
*B32B 27/30* (2006.01)
*C08L 33/10* (2006.01)
*C08L 29/14* (2006.01)
*C08J 5/18* (2006.01)

(52) U.S. Cl. ........... 428/463; 525/57; 525/228; 525/229

(58) Field of Classification Search .................. 428/463; 525/57, 228, 229
See application file for complete search history.

(56) References Cited

U.S. PATENT DOCUMENTS

| 2,326,543 A | 8/1943 | Macht |
| 2004/0147675 A1 * | 7/2004 | Hofmann .................. 525/165 |
| 2006/0036036 A1 | 2/2006 | Hofmann | |

FOREIGN PATENT DOCUMENTS

| GB | 721340 | | 1/1955 |
| JP | 01 318059 | | 12/1989 |
| JP | 01318059 | A * | 12/1989 |
| JP | 06 128022 | | 5/1994 |
| JP | 08 197855 | | 8/1996 |
| JP | 2006 508232 | | 3/2006 |
| WO | WO 93/11206 | A2 | 6/1993 |

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

An acrylic thermoplastic resin composition is obtained by melt-kneading a methacrylic resin (A) and a polyvinyl acetal resin (B) at a resin temperature of not less than 140° C. while applying shear at a shear rate of 100 sec$^{-1}$ or more, and then cooling the kneaded product to not more than 120° C. In the acrylic thermoplastic resin composition, at least the methacrylic resin (A) forms a continuous phase, and among glass transition temperatures of the acrylic thermoplastic resin composition, a glass transition temperature $Tg_{A\,P}$ ascribed to the methacrylic resin (A) indicates a value between a glass transition temperature ($Tg_A$) of the methacrylic resin (A) alone and a glass transition temperature ($Tg_B$) of the polyvinyl acetal resin (B) alone. A film- or sheet-like molded article is obtained by molding the resin composition. An acrylic resin composite is obtained by laying a layer of metal and/or metal oxide on at least one side of the acrylic resin molded article.

23 Claims, No Drawings

ACRYLIC THERMOPLASTIC RESIN COMPOSITION, ACRYLIC RESIN FILM AND ACRYLIC RESIN COMPOSITE

CROSS REFERENCE TO RELATED APPLICATION

This application is a 371 of PCT/JP07/070597, filed on Oct. 23, 2007, and claims priority to the following Japanese Patent Applications: 2006-287745, filed on Oct. 23, 2006; 2007-081872, filed on Mar. 27, 2007; and 2007-090863, filed on Mar. 30, 2007.

TECHNICAL FIELD

The present invention relates to an acrylic thermoplastic resin composition from which a transparent molded article having improved toughness can be obtained, and particularly relates to an acrylic thermoplastic resin composition from which a molded article (a film etc.) that is not whitened when stretched, bent, subjected to impact and/or left under heat and humidity conditions for a long period of time, can be obtained. The present invention also relates to an acrylic thermoplastic resin composition from which a transparent molded article having an excellent balance among surface hardness, rigidity, and toughness.

Further, the present invention relates to an acrylic resin film (the term "film" in the present invention generally refers to those having a thickness of not more than 500 μm; the same applies hereinafter) that has good handleability and surface smoothness while maintaining excellent properties, such as transparency, weather resistance, and surface hardness, inherent in acrylic resins.

Moreover, the present invention relates to an acrylic resin composite, more specifically a metallic lustrous acrylic resin composite obtained by laying a layer of metal and/or metal oxide on at least one side of the acrylic resin molded article, the composite having excellent surface hardness, surface smoothness, specular gloss, as well as handleability.

BACKGROUND ART

Methacrylic resins, those are thermoplastic polymers composed mainly of polymethyl methacrylate are used in various fields due to excellent properties of transparency (high total light transmittance in the visible light region) and surface hardness.

For example, transparent methacrylic resin films are used in the interior of automobiles, exterior of household appliances, wallpapers, and other substrates, for the purpose of decoration or design with wood grain or other patterns; and protections for the substrates such as addition of scratch resistance and weather resistance.

Moreover, methacrylic resin composites (composite films etc.) coated with metal and metal oxide film are used in order to add design such as a metallic pattern to substrates, and to protect substrates (adding scratch resistance and weather resistance).

However, methacrylic resins may lack mechanical properties, particularly toughness, depending on the application. In particular, methacrylic resin films are extremely brittle, making film formation difficult and also causing very poor handleability. Some methacrylic resin films crack when trimmed simultaneously with film formation, cut after film formation, or pasted to a substrate, or when unnecessary portions (burrs) are removed after the film is pasted to the substrate.

Then, in order to remedy brittleness of molded articles composed only of methacrylic resins, acrylic resin compositions containing so-called core-shell particles and molded articles obtained by using such acrylic resin compositions are proposed.

For example, Patent Literature 1 proposes a film- or sheet-like molded article obtained by mixing core-shell particles (commonly known as two-layer core-shell particles) obtained by copolymerizing a methacrylic acid alkyl ester and an acrylic acid alkyl ester in the presence of particles of a cross-linked acrylic acid alkyl ester polymer, with a methacrylic resin.

The acrylic resin molded articles containing such two-layer core-shell particles generally have low surface hardness. For remedying this, so-called three-layer core-shell particles (Patent Literature 2) and acrylic resin molded articles containing such three-layer core-shell particles (Patent Literatures 3 and 4) are proposed.
Patent Literature 1: Japanese Examined Patent Publication No. 56-27378
Patent Literature 2: Japanese Examined Patent Publication No. 55-27576
Patent Literature 3: Japanese Registered Patent No. 3287255
Patent Literature 4 Japanese Registered Patent No. 3287315

However, in molded articles comprising the resin compositions obtained by mixing core-shell particles, although impact resistance is improved, toughness is insufficiently improved. Additionally, rubber components contained in the molded article cause decreases in surface hardness, rigidity, heat resistance, and transparency (particularly increase in haze). Further, when the molded article is stressed, for example, stretched or bent, the stress riser may be whitened. Moreover, when the molded article is subjected to impact or left under heat and humidity conditions for a long time, whitening may occur. Such a whitened molded article loses transparency, and design characteristics and high-grade feeling of the molded article are likely to be impaired.

Further, core-shell particles themselves are cross-linked, and thus have no flowability. Therefore, parts of core-shell particles fatally project from the surface of the molded article. This degraded the surface smoothness of acrylic resin molded articles. Films having reduced surface smoothness are increasingly easy to crack when cut after film formation or pasted to a substrate, or when unnecessary portions (burrs) are removed after the film is pasted to the substrate.

When a layer of metal and/or metal oxide is formed on the surface of an acrylic resin molded article (e.g., a film), the surface smoothness of the molded article has very important influence. That is, the surface smoothness of the molded article directly affects the surface smoothness of the metal and/or metal oxide layer formed on the surface of the molded article, and eventually affects handleability and design characteristics such as specular gloss of the composite.

Further, when the surface of other resin is decorated with an acrylic resin molded article on which a metal and/or metal oxide layer is laid by an injection-molding simultaneous lamination method, low surface smoothness of the acrylic resin molded article causes a dramatic decrease in surface gloss.

Then, as a film that has high surface smoothness and particularly can exhibit good design characteristics even when a layer of metal and/or metal oxide is formed on the film, Patent Literature 5 proposes an acrylic resin film comprising acrylic rubber particles, obtained by melt-extruding an acrylic rubber particle-containing acrylic resin from a T-die, and forming the extruded resin into a film while being sandwiched between two mirror-finished rolls at a pressing pressure (linear pressure) of 300 N/cm or higher, wherein at least one side of the film has a center line average roughness Ra (defined in JIS B0601) of 0.01 to 0.05 μm.

In Patent Literature 5, Ra is measured using a measurement stylus with a tip radius of 3 μm and a surface roughness meter (Surfcom 570 A; manufactured by Tokyo Seimitsu, Co., Ltd.). As a result of investigations, the present inventors found that the size of this measurement stylus is much larger than that of a core-shell particle (usually from several tens to several hundreds nm in size), and therefore the degree of projection of core shell particles etc. could not exactly be evaluated. The inventors also found that the presence of aggregated core-shell particles (usually from several hundreds to 1 μm in size) was not significantly reflected in Ra. Thus, even an acrylic resin film having a center line average roughness Ra in the above range could not sufficiently prevent undesirable cracks originating from defects caused by projected core-shell particles or aggregated core-shell particles when the film was cut after film formation or pasted to a substrate, or when unnecessary portions (burrs) were removed after the film was pasted to the substrate.

Patent Literature 5: Japanese Patent Laid-Open No. 2003-253016

Furthermore, when resin compositions comprising only core-shell particles were stretched, bent, or subjected to impact, the processed parts were easily whitened, thereby reducing transparency, and toughness was insufficient. In addition, resin compositions comprising only core-shell particles were hard to satisfy handleability, surface hardness, and surface smoothness of acrylic resin molded articles (films) at the same time.

As other methods for improving toughness of methacrylic resins, other polymer to be blended in a methacrylic resin is proposed.

For example, polycarbonate is mentioned as a polymer that can be expected to improve balance among toughness, heat resistance, and transparency. A composition of polymethyl methacrylate and polycarbonate of bisphenol A can reportedly be obtained by, for example, dissolving polymethyl methacrylate and polycarbonate in tetrahydrofuran, precipitating the mixture in heptane, and heat-treating the precipitate at a temperature higher than the glass transition temperatures of the polymethyl methacrylate and polycarbonate. However, molded articles formed from this composition have low surface hardness. Further, since a solvent is used for the preparation of the composition, great deal of energy is necessary to remove the solvent. Thus, productivity is low. In addition, a method of melt-kneading polycarbonate and polymethyl methacrylate is also reported. However, compositions obtained by melt-kneading produce opaque and pearlescent molded articles because of phase separation of polycarbonate and polymethyl methacrylate (Non Patent Literature 1).

Non Patent Literature 1: Journal of Polymer Science PART B, Polymer Physics, Vol. 25, 1459 (1987)

Polyvinyl butyral is mentioned as a polymer potentially compatible with polymethyl methacrylate.

Non Patent Literature 2 discloses that since a methyl methacrylate resin and polyvinyl butyral are weakly compatible, products obtained by mixing them usually have a two-phase structure as a result of phase separation; however, a methyl methacrylate resin having a low molecular weight and polyvinyl butyral are possibly compatible, thus forming a single phase. FIG. 5 in Non Patent Literature 2 shows an optical microscope image of a film obtained by dissolving a blend of 50 parts by mass of methyl methacrylate resin and 50 parts by mass of polyvinyl butyral containing various amounts of vinyl alcohol units, in a solvent, and carrying out cast molding. This film has a phase separation structure in which the methyl methacrylate resins form various sizes of dispersed phases. Due to the use of a solvent in the production of this film, there are drawbacks such as low productivity and contamination of film production environments.

Non Patent Literature 2: Macromolecules, Vol. 34, 4277 (2001)

Non Patent Literature 3 teaches that polyvinyl butyral and polymethyl methacrylate having a weight average molecular weight of 120,000 were melt-kneaded in various proportions to obtain blends. According to Non Patent Literature 3, in blends containing larger amounts of polyvinyl butyral, elongation at fracture in a tension test is greater, yield behavior is observed, and toughness is improved. However, the blends containing larger amounts of polyvinyl butyral described in Non Patent Literature 3 had insufficient dynamic properties. In contrast, in blends containing polyvinyl butyral in an amount of less than 50% by mass, toughness was barely improved, and dynamic properties were insufficient.

Non Patent Literature 3: J. Ind. Eng. Chem., Vol. 8, No. 6, 530 (2002)

Patent Literature 6 discloses a resin composition composed of a plasticized polyvinyl acetal resin and a block copolymer containing a methacrylic polymer block and an acrylic polymer block. According to Patent Literature 6, this resin composition is used to bond two glass sheets together, and whitening phenomenon due to contact with air is suppressed. However, the resin composition has very low surface hardness.

Patent Literature 6: Japanese Patent Laid-Open No. 2003-40653

DISCLOSURE OF THE INVENTION

Problems to be Resolved by the Invention

A primary object of the present invention is to provide an acrylic thermoplastic resin composition that has improved toughness while maintaining transparency, high surface hardness, high rigidity, weather resistance, heat resistance, and other properties inherent in methacrylic resins; and particularly, to provide an acrylic thermoplastic resin composition that is not whitened when stretched, bent, subjected to impact, or left under heat and humidity conditions for a long period of time, and a molded article or film comprising this acrylic thermoplastic resin composition.

A second object of the present invention is to provide an acrylic resin film that has good handleability, high surface hardness, and good surface smoothness with few surface defects.

A third object of the present invention is to provide a metallic lustrous acrylic resin composite comprising an acrylic resin molded article and a layer of metal and/or metal oxide laid on at least one side of the acrylic resin molded article, the composite having excellent surface hardness, surface smoothness, specular gloss, as well as handleability.

Means of Solving the Problems

The present inventors have earnestly proceeded with studies in order to achieve the above objects and found the followings: A methacrylic resin and a polyvinyl acetal resin are melt-kneaded under specific conditions, thereby producing an acrylic thermoplastic resin composition wherein at least a methacrylic resin (A) forms a continuous phase, and among glass transition temperatures of the acrylic thermoplastic resin composition, a glass transition temperature ($Tg_{A\ P}$)

ascribed to the methacrylic resin (A) indicates a value between a glass transition temperature ($Tg_A$) of the methacrylic resin (A) alone and a glass transition temperature ($Tg_B$) of a polyvinyl acetal resin (B) alone. And the acrylic thermoplastic resin composition has good toughness while maintaining transparency, high surface hardness, high rigidity, weather resistance, heat resistance, and other properties inherent in methacrylic resins.

Further, molded articles or films formed from this composition are barely whitened when stretched, bent, subjected to impact, or left under heat and humidity conditions for along period of time. In addition, molded articles (films) formed from the acrylic thermoplastic resin composition of the present invention have higher tear strength and significantly improved handleability, compared with films composed only of methacrylic resins.

Moreover, a specific methacrylic resin and a specific polyvinyl acetal resin are melt-kneaded in a specific mass ratio, and then formed into a film by a specific method, thereby producing an acrylic resin film that has good handleability and high surface smoothness while maintaining excellent properties, such as transparency, weather resistance, and surface hardness, inherent in acrylic resins.

Furthermore, a film of metal or metal oxide is laid on at least one side of a molded article that is obtained by melt-kneading a specific methacrylic resin and a specific polyvinyl acetal resin in a specific mass ratio, thereby producing a metallic lustrous acrylic resin composite that has excellent surface hardness, handleability, as well as surface smoothness.

The present invention has been completed upon further studies based on these findings.

Specifically, the present invention includes the following embodiments.

(1) An acrylic thermoplastic resin composition comprising a methacrylic resin (A) and a polyvinyl acetal resin (B), wherein at least the methacrylic resin (A) forms a continuous phase, and among glass transition temperatures of the acrylic thermoplastic resin composition, a glass transition temperature ($Tg_{A\_P}$) ascribed to the methacrylic resin (A) indicates a value between a glass transition temperature ($Tg_A$) of the methacrylic resin (A) alone and a glass transition temperature ($Tg_B$) of the polyvinyl acetal resin (B) alone.

(2) The acrylic thermoplastic resin composition according to the above-described, wherein the mass ratio (A)/(B) of the methacrylic resin (A) to the polyvinyl acetal resin (B) is 99/1 to 51/49.

(3) The acrylic thermoplastic resin composition according to the above-described, wherein the methacrylic resin (A) has a weight average molecular weight (Mw) of 40000 or more.

(4) The acrylic thermoplastic resin composition according to the above-described, wherein the polyvinyl acetal resin (B) has an acetalization degree of 55 to 83 mol %.

(5) The acrylic thermoplastic resin composition according to the above-described, wherein the polyvinyl acetal resin (B) is obtained by (co-)acetalizing a polyvinyl alcohol resin having a number average polymerization degree of 200 to 4000.

(6) The acrylic thermoplastic resin composition according to the above-described, wherein the polyvinyl acetal resin (B) is obtained by adjusting pH of a slurry obtained by (co-)acetalizing a polyvinyl alcohol resin to 6 to 8, and then drying the slurry.

(7) The acrylic thermoplastic resin composition according to the above-described, wherein the polyvinyl acetal resin (B) is obtained by (co-)acetalizing a polyvinyl alcohol resin with an aldehyde compound containing butyl aldehyde.

(8) The acrylic thermoplastic resin composition according to the above-described, wherein the polyvinyl acetal resin (B) is polyvinyl butyral.

(9) The acrylic thermoplastic resin composition according to the above-described, wherein the polyvinyl acetal resin (B) is polyvinyl butyral having a butyralization degree of 55 to 75 mol %.

(10) The acrylic thermoplastic resin composition according to the above-described, wherein at least one of flexural modulus measured according to JIS K7171 using a specimen 80 mm long×10 mm wide×4 mm thick at a strain rate of 1 mm/min., and elongation modulus measured according to JIS K7162 using a 1A-type dumbbell specimen at a strain rate of 1 mm/min. is not less than 2 GPa.

(11) The acrylic thermoplastic resin composition according to the above-described, which has a yield stress point in a bending test conducted according to JIS K7171 on a specimen 80 mm long×10 mm wide×4 mm thick at a strain rate of 1 mm/min.

(12) The acrylic thermoplastic resin composition according to the above-described, of which the change in haze before and after left at a temperature of 60° C. and a humidity of 90% for 1500 hours is less than 1.0%.

(13) A method of producing the acrylic thermoplastic resin composition according to the above-described, comprising the steps of:
melt-kneading the methacrylic resin (A) and the polyvinyl acetal resin (B) at a resin temperature of 140° C. or more while applying shear at a shear rate of 100 sec$^{-1}$ or more; and then
cooling the kneaded product to 120° C. or less.

(14) The acrylic thermoplastic resin composition production method according to the above-described, wherein in the step of melt-kneading the methacrylic resin (A) and the polyvinyl acetal resin (B) at a resin temperature of 140° C. or more, a stage of applying shear at a shear rate of 100 sec$^{-1}$ or more and a stage of reducing the shear rate to 50 sec$^{-1}$ or less are each repeated at least twice.

(15) An acrylic thermoplastic resin composition obtained by the acrylic thermoplastic resin composition production method according to the above-described.

(16) A molded article comprising the acrylic thermoplastic resin composition according to the above-described.

(17) The molded article according to the above-described, of which the change in haze before and after left at a temperature of 60° C. and a humidity of 90% for 1500 hours is less than 1.0%.

(18) A film comprising the acrylic thermoplastic resin composition according to the above-described.

(19) The film according to the above-described, of which the surface has a JIS pencil hardness of HB or harder.

(20) The film according to the above-described, wherein the polyvinyl acetal resin (B) is polyvinyl butyral, and the surface of the film has a JIS pencil hardness of F or harder.

(21) The film according to the above-described, of which the change in haze before and after left at a temperature of 60° C. and a humidity of 90% for 1500 hours is less than 1.0%.

(22) An acrylic resin molded article or acrylic resin film comprising a methacrylic resin (A) having a weight average molecular weight of 40000 or more, and a polyvinyl acetal resin (B) having an acetalization degree of 55 to 83 mol % obtained by (co-) acetalizing a polyvinyl alcohol resin having a number average polymerization degree of 200 to 4000, at a mass ratio (A)/(B) of 99/1 to 51/49, wherein at least one side of the molded article or film has a roughness of 1.5 nm or less.

(23) The acrylic resin molded article or acrylic resin film according to the above-described, which is 0.3% or less in a haze measured according to JIS K7136.

(24) The acrylic resin molded article or acrylic resin film according to the above-described, which has the pencil hardness of HB or harder.

(25) The acrylic resin molded article or acrylic resin film according to the above-described, which is obtained by melt-kneading the above methacrylic resin (A) and the above polyvinyl acetal resin (B), extruding the kneaded product from a T-die in a molten state, and bringing both faces of the extruded product into contact with the surface of mirror-finished rolls or mirror-finished belts for shape forming.

(26) The acrylic resin molded article or acrylic resin film according to the above-described, wherein printing is placed on at least one side of the acrylic resin molded article or acrylic resin film.

(27) A method of producing an acrylic resin film, comprising the steps of:

melt-kneading a methacrylic resin (A) having a weight average molecular weight of 40000 or more, and a polyvinyl acetal resin (B) having an acetalization degree of 55 to 83 mol % obtained by (co-) acetalizing a polyvinyl alcohol resin having a number average polymerization degree of 200 to 4000, at a mass ratio (A)/(B) of 99/1 to 51/49;

extruding the kneaded product from a T-die in a molten state; and bringing the both faces of the extruded product into contact with the surface of mirror-finished rolls or mirror-finished belts for shape forming.

(28) A laminated body comprising a thermoplastic resin and/or a thermosetting resin, and the film according to the above-described laid on the surface of the resin.

(29) A method of producing a laminated body, comprising the steps of:

inserting the film according to the above-described between male and female dies in an injection mold; and injecting a thermoplastic resin into one side of the film in the injection mold.

(30) A laminated body obtained by the laminated body production method according to the above-described.

(31) A laminated film comprising the film (1) according to the above-described and at least one other thermoplastic resin layer laid on at least one side of the film (1).

(32) A laminated body comprising a thermoplastic resin and/or a thermosetting resin; and the laminated film according to the above-described laid on the surface of the resin.

(33) A method of producing a laminated body, comprising the steps of:

inserting the laminated film according to the above-described between male and female dies in an injection mold; and injecting a thermoplastic resin into one side of the laminated film in the injection mold.

(34) A laminated body obtained by the above laminated body production method.

(35) An acrylic resin composite comprising an acrylic resin molded article comprising a methacrylic resin (A) having a weight average molecular weight of 40000 or more, and a polyvinyl acetal resin (B) having an acetalization degree of 55 to 83 mol % obtained by (co-)acetalizing a polyvinyl alcohol resin having a number average polymerization degree of 200 to 4000, at a mass ratio (A)/(B) of 99/1 to 51/49; and a layer of metal and/or metal oxide laid on at least one side of the acrylic resin molded article.

(36) The acrylic resin composite according to the above-described, wherein the acrylic resin molded article is a film, sheet, or plate.

(37) The acrylic resin composite according to the above-described, wherein the surface of the acrylic resin molded article on which a metal and/or metal oxide layer is formed has a roughness of 1.5 nm or less.

(38) The acrylic resin composite according to the above-described, wherein both sides of the acrylic resin molded article have a roughness of 1.5 nm or less.

(39) The acrylic resin composite according to the above-described, wherein the acrylic resin molded article is obtained by melt-kneading a methacrylic resin (A) having a weight average molecular weight of 40000 or more, and a polyvinyl acetal resin (B) having an acetalization degree of 55 to 83 mol % obtained by (co-)acetalizing a polyvinyl alcohol resin having a number average polymerization degree of 200 to 4000; extruding the kneaded product from a T-die in a molten state; and bringing both sides of the extruded product into contact with the surface of mirror-finished rolls or mirror-finished belts.

(40) The acrylic resin composite according to the above-described, wherein the surface of the above acrylic resin molded article has the pencil hardness of H or harder.

(41) The acrylic resin composite according to the above-described, wherein the above acrylic resin molded article has a thickness of 500 μm or less.

(42) The acrylic resin composite according to the above-described, wherein printing is placed on one side of the above acrylic resin molded article.

(43) The acrylic resin composite according to the above-described, which further comprises a layer of other thermoplastic resin laid on one side of the above acrylic resin molded article.

(44) A laminated body comprising a thermoplastic resin and/or a thermosetting resin, and the above film- or sheet-like acrylic resin composite laid on the surface of the resin.

(45) A method of producing the laminated body according to the above-described, comprising the steps of:

inserting the above film- or sheet-like acrylic resin composite between male and female dies in an injection mold; and injecting a thermoplastic resin into one side of the acrylic resin composite in the injection mold.

Advantages of the Invention

The acrylic thermoplastic resin composition in the present invention has excellent toughness while maintaining transparency, high surface hardness, high rigidity, weather resistance, heat resistance, and other properties inherent in methacrylic resins. Molded articles and films formed from such compositions are hardly whitened when stretched, bent, subjected to impact, or left under heat and humidity conditions for a long period of time. Further, such molded articles (films) formed from the acrylic thermoplastic resin composition in the present invention are easy to handle since they have higher tear strength, compared to films composed only of methacrylic resins. The acrylic thermoplastic resin composition in the present invention having these advantages can be used for a wider range of purposes.

The acrylic resin film in the present invention has transparency, high surface hardness, and other properties inherent in methacrylic resins, and can achieve a good balance among handleability, toughness, surface hardness, and surface smoothness, which could not be achieved by conventional acrylic resin films. Taking advantage of these excellent properties, the acrylic resin film in the present invention can be suitably used in products for which design characteristics are required and in optical applications.

The acrylic resin laminated body and the acrylic resin composite in the present invention are excellent in surface hardness, surface smoothness, specular gloss, as well as handleability. Taking advantage of these properties, the acrylic resin composite in the present invention can be suitably used in products for which design characteristics are required.

BEST MODE FOR CARRYING OUT THE INVENTION

[Acrylic Thermoplastic Resin Composition]

The acrylic thermoplastic resin composition in the present invention comprises a methacrylic resin (A) and a polyvinyl acetal resin (B).

The methacrylic resin (A) used in the present invention is obtained by polymerizing a monomer mixture that contains an alkyl methacrylate.

Examples of alkyl methacrylate include methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, octyl methacrylate, 2-ethylhexyl methacrylate, dodecyl methacrylate, myristyl methacrylate, palmityl methacrylate, stearyl methacrylate, behenyl methacrylate, cyclohexyl methacrylate, phenyl methacrylate, and the like. The alkyl methacrylate may be used as single or in combination of two or more. Among these, alkyl methacrylate having 1 to 4 carbon atoms in the alkyl group is preferable, and methyl methacrylate is particularly preferable.

Monomer other than alkyl methacrylate include alkyl acrylate, and also other ethylenically unsaturated monomer copolymerizable with alkyl methacrylate and alkyl acrylate.

Examples of alkyl acrylate include methyl acrylate, ethyl acrylate, propyl acrylate, isopropyl acrylate, n-butyl acrylate, sec-butyl acrylate, tert-butyl acrylate, pentyl acrylate, hexyl acrylate, octyl acrylate, 2-ethylhexyl acrylate, dodecyl acrylate, myristyl acrylate, palmityl acrylate, stearyl acrylate, behenyl acrylate, cyclohexyl acrylate, phenyl acrylate, and the like. Among these, alkyl acrylate having 1 to 8 carbon atoms in the alkyl group is preferable. The alkyl acrylate may be used as single or in combination of two or more.

Examples of ethylenically unsaturated monomer copolymerizable with alkyl methacrylate and alkyl acrylate include diene compounds such as 1,3-butadiene and isoprene; vinyl aromatic compounds such as styrene, α-methylstyrene, vinyl toluene, 2,4-dimethylstyrene, halogen-nuclear-substituted styrene, 1-vinyl naphthalene, 4-methylstyrene, 4-propylstyrene, 4-cyclohexylstyrene, 4-dodecylstyrene, 2-ethyl-4-benzylstyrene, and 4-(phenylbutyl) styrene; ethylenically unsaturated nitriles such as acrylonitrile and methacrylonitrile; acrylic acid, methacrylic acid, acrylamide, methacrylamide, maleic anhydride, maleic imide, monomethyl maleate and dimethyl maleate; and the like.

These ethylenically unsaturated monomer may be used as single or in combination of two or more.

In the methacrylic resin (A) used in the present invention, the alkyl methacrylate unit content is preferably 50 to 100% by mass, and more preferably 80 to 99.9% by mass, in terms of weather resistance.

Further, from the standpoint of heat resistance of the methacrylic resin (A), it is preferable to contain an alkyl acrylate unit in the range of 0.1 to 20% by mass.

The methacrylic resin (A) used in the present invention preferably has a weight average molecular weight (hereinafter referred to as Mw) of not less than 40,000, more preferably 40,000 to 10,000,000, and particularly preferably 80,000 to 1,000,000, in terms of strength properties and fusibility. The methacrylic resin (A) used in the present invention may have a polymer chain having a linear, branched, or cyclic structure.

The methacrylic resin (A) used in the present invention is not limited by the production method as long as the method can polymerize α,β-unsaturated compounds; however, those produced by radical polymerization are preferable. As polymerization methods, bulk polymerization, suspension polymerization, solution polymerization, emulsion polymerization, and the like, are mentioned.

Examples of radical polymerization initiators used in polymerization include azobisisobutyronitrile, azobis γ-dimethylvaleronitrile, and like azo compounds; benzoyl peroxide, cumyl peroxide, oxyneodecanoate, diisopropyl peroxydicarbonate, t-butyl cumyl peroxide, cumene hydroperoxide, t-butyl hydroperoxide, cyclohexanone peroxide, methyl ethyl ketone peroxide, dicumyl peroxide, lauroyl peroxide, and like peroxides. A polymerization initiator is usually used in an amount of 0.05 to 0.5 parts by mass with respect to 100 parts by mass of the total monomers. Polymerization is usually carried out at a temperature of 50 to 140° C. for 2 to 20 hours.

Chain transfer agents can be used to control a molecular weight of the methacrylic resin (A). Examples of chain transfer agents include methyl mercaptan, ethyl mercaptan, isopropyl mercaptan, n-butyl mercaptan, t-butylmercaptan, n-hexylmercaptan, n-octylmercaptan, n-dodecyl mercaptan, ethylthioglycolate, mercaptoethanol, thio-β-naphthol, thiophenol, and the like. A chain transfer agent is usually used in an amount ranging from 0.005 to 0.5% by mass with respect to the total amount of monomers.

The methacrylic resin (A) used in the present invention may contain, if necessary, various additives, for example, antioxidants, stabilizers, ultraviolet absorbers, lubricants, processing aids, antistatic agents, colorants, impact resistance aids, foaming agents, fillers, matting agents, and the like. From the standpoint of dynamic properties and surface hardness of thermoplastic resin compositions, it is preferable not to add a large amount of softener or plasticizer.

The polyvinyl acetal resin (B) generally has repeating units represented by Chemical Formula 1.

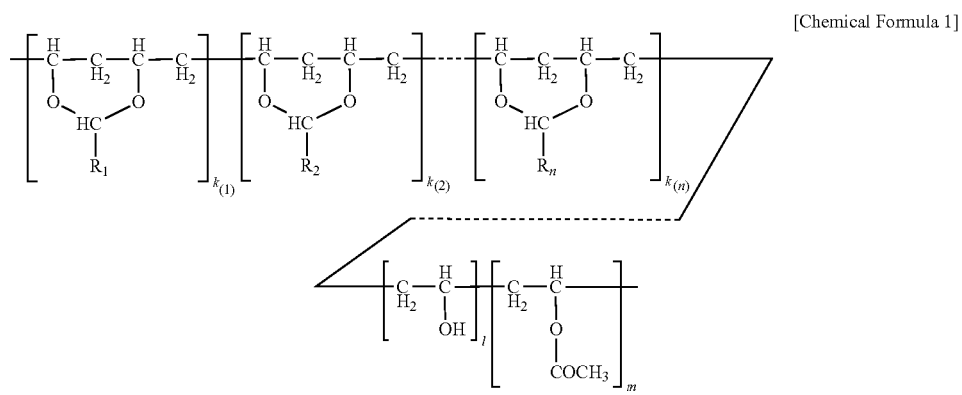

[Chemical Formula 1]

In Chemical Formula 1, n is the number (natural number) of types of aldehyde used in acetalization; $R_1, R_2, \ldots, R_n$, are independently an alkyl residue of aldehyde used in the acetalization reaction, or a hydrogen atom; $k_{(1)}, k_{(2)}, \ldots, k_{(n)}$ are independently the proportion of each acetal unit containing $R_1, R_2, \ldots, R_n$, (molar ratio); 1 is the proportion of vinyl alcohol unit (molar ratio); and m is the proportion of vinyl acetate unit (molar ratio). However, $k_{(1)}+k_{(2)}+\ldots+k_{(n)}+l+m=1$ is satisfied, and any of $k_{(1)}, k_{(2)}, \ldots, k_{(n)}$, l, and m may be zero. Each repeating unit is not limited by the arrangement sequence as shown in Chemical Formula 1, and may be arranged in random, in block form, or in taper form.

The polyvinyl acetal resin (B) used in the present invention is obtained by, for example, reacting a polyvinyl alcohol resin with aldehyde.

The polyvinyl alcohol resin used in the production of polyvinyl acetal resins has a number average polymerization degree of usually 200 to 4,000, preferably 300 to 3,000, and more preferably 500 to 2,000. Polyvinyl alcohol resins having a number average polymerization degree of less than 200 tend to produce polyvinyl acetal resins with insufficient dynamic properties, resulting in lack of dynamic properties, particularly toughness, of the acrylic thermoplastic resin composition in the present invention. In contrast, polyvinyl alcohol resins having a number average polymerization degree of more than 4,000 tend to cause an increase in melt viscosity during melt-kneading the acrylic thermoplastic resin composition in the present invention, making the production of the acrylic thermoplastic resin composition difficult.

Polyvinyl alcohol resins are not limited by the production method. For example, those produced by saponifying polyvinyl acetate and the like with alkali, acid, ammonia water, and the like, can be used.

Polyvinyl alcohol resins may be either completely saponified or partially saponified. It is preferable to use those having a saponification degree of 80 mol % or more.

As such polyvinyl alcohol resins, ethylene-vinyl alcohol copolymer resins, partially saponified ethylene-vinyl alcohol copolymer resins, and like copolymers of vinyl alcohol and monomers copolymerizable with the vinyl alcohol can be used. Further, modified polyvinyl alcohol resins partly introduced with carboxylic acid and the like can also be used.

These polyvinyl alcohol resins may be used singly or in combination of two or more.

Aldehydes used in the production of the polyvinyl acetal resin (B) are not limited. Examples include formaldehyde (including paraformaldehyde), acetaldehyde (including paraacetaldehyde), propionaldehyde, butylaldehyde, n-octylaldehyde, amylaldehyde, hexylaldehyde, heptylaldehyde, 2-ethylhexylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, β-phenylpropionaldehyde, and the like. These aldehydes may be used singly or in combination of two or more. Among these aldehydes, those consisting mainly of butylaldehyde are preferable in terms of easy production.

The polyvinyl acetal resin (B) obtained by acetalization of a polyvinyl alcohol resin with aldehyde comprising mainly butylaldehyde is particularly referred to as polyvinyl butyral. In the present invention, polyvinyl butyral having a butyral unit content (see the following formula) of more than 0.9, among acetal units present in the polyvinyl acetal resin, is preferable. More specifically, it is preferable that in the structural formula of the polyvinyl acetal resin shown in Chemical Formula 1, when $R_1=C_3H_7$ (alkyl residue of butyl aldehyde) is satisfied, the inequality: $k_{(1)}/(k_{(1)}+k_{(2)}+\ldots+k_{(n)})>0.9$ is satisfied.

The reaction of a polyvinyl alcohol resin with aldehyde ((co-)acetalization reaction) can be carried out by a known process. Examples include an aqueous medium process in which aldehyde and an aqueous solution of polyvinyl alcohol resin are acetalized in the presence of an acid catalyst to precipitate resin particles; a solvent process in which a polyvinyl alcohol resin is dispersed in an organic solvent and acetalized with aldehyde in the presence of an acid catalyst, and then the reaction mixture is precipitated with water or the like which is a poor solvent for the polyvinyl acetal resin; or the like. Among these, the aqueous medium process is preferred.

The above-mentioned acid catalysts are not limited. Examples include acetic acid, p-toluenesulfonic acid, and like organic acids; nitric acid, sulfuric acid, hydrochloric acid, and like inorganic acids; carbon dioxide gas, and like gases showing acidity when dissolved in an aqueous solution; cation exchanger, metal oxide, and like solid acid catalysts; and so on.

The polyvinyl acetal resin (B) used in the present invention preferably has an acetalization degree of 55 to 83 mol %. The use of such a polyvinyl acetal resin having this range of acetalization degree facilitates melt processing or production, and enables inexpensive production of the acrylic thermoplastic resin composition in the present invention.

The acetalization degree (mol %) of the polyvinyl acetal resin (B) is defined by the following formula:

$$\text{Acetalization degree (mol \%)} = [k_{(1)}+k_{(2)}+\ldots+k_{(n)}] \times 2/[[k_{(1)}+k_{(2)}+\ldots+k_{(n)}] \times 2+l+m] \times 100$$

The acetalization degree of the polyvinyl acetal resin may be determined in accordance with the method described in JIS K6728 (1977). More specifically, the mass ratio of vinyl alcohol unit ($l_0$) and the mass ratio of vinyl acetate unit ($m_0$) are determined by titration; the mass ratio of vinyl acetal unit ($k_0$) is calculated by the formula: $k_0=1-l_0-m_0$; the molar ratio of vinyl alcohol unit (l) and the molar ratio of vinyl acetate unit (m) are calculated therefrom; the ratio of vinyl acetal unit ($k=k_{(1)}+k_{(2)}+\ldots+k_{(n)}$) is calculated by the formula: $k=1-l-m$; and the acetalization degree (mol %) is determined by the formula: $[k_{(1)}+k_{(2)}+\ldots+k_{(n)}] \times 2/[[k_{(1)}+k_{(2)}+\ldots+k_{(n)}] \times 2+l+m] \times 100$. Alternatively, the acetalization degree may be determined by measuring a solution of a polyvinyl acetal resin dissolved in deuterated dimethyl sulfoxide with $^1$H-NMR or $^{13}$C-NMR.

The ratio of acetalization with butyl aldehyde is particularly referred to as the butyralization degree. In the structural formula of the polyvinyl acetal shown in Chemical Formula 1, when $R_1=C_3H_7$ (alkyl residue of butyl aldehyde) is satisfied, the butyralization degree is defined by the following formula:

$$\text{Butyralization degree (mol \%)} = [k_{(1)}] \times 2/[[k_{(1)}+k_{(2)}+\ldots+k_{(n)}] \times 2+l+m] \times 100$$

It is more preferable that the polyvinyl acetal resin used in the present invention has a butyralization degree of 55 to 75 mol %. More specifically, it is preferable that in the structural formula of the polyvinyl acetal shown in Chemical Formula 1, when $R_1=C_3H_7$ (alkyl residue of butyl aldehyde) is satisfied, the inequality: $0.55 \leq k_{(1)} \leq 0.75$ is satisfied. When using a polyvinyl acetal resin having a butyralization degree in the above range, dynamic properties, particularly toughness, are excellent, and the acrylic thermoplastic resin composition in the present invention can be easily and inexpensively obtained. Moreover, when using a polyvinyl acetal resin having a butyralization degree in the above range, the difference between the refractive index of the methacrylic resin (A) and the refractive index of the polyvinyl butyral is smaller, and transparency (high visible light transmission and low haze), which is a feature of the methacrylic resin (A), is easily retained. Furthermore, a feature that the acrylic thermoplastic resin composition is hardly whitened when stretched, bent, subjected to impact and/or left under heat and humidity conditions for a long period of time is easily achieved.

Suitable polyvinyl acetal resins comprise a vinyl alcohol unit in an amount of usually 17 to 45 mol % ($0.17 \leq l \leq 0.45$), and a vinyl acetate unit in an amount of usually not less than 0 mol % and not more than 5 mol % ($0 \leq m \leq 0.05$), and preferably not less than 0 mol % and not more than 3 mol % ($0 \leq m \leq 0.03$).

Slurries prepared by the aqueous medium process or the solvent process usually exhibit acidity because of an acid catalyst. The acid catalyst can be removed by, for example, repeatedly washing the slurry with water to adjust the pH to usually 5 to 9, preferably 6 to 9, and more preferably 6 to 8; adding a neutralizer to the slurry to adjust the pH to usually 5 to 9, preferably 6 to 9, and more preferably 6 to 8; adding alkylene oxides to the slurry; or the like.

Examples of compounds used to remove the acid catalyst include sodium hydroxide, potassium hydroxide, ammonia, sodium acetate, sodium carbonate, sodium hydrogen carbonate, potassium carbonate, and like alkali metal compounds; ammonia, and ammonia aqueous solution. Examples of alkylene oxides include ethylene oxide, propylene oxide; and ethylene glycol diglycidyl ether and like glycidyl ethers.

Next, salts generated by neutralization, reaction residues of aldehyde and the like are removed. The removal method is not limited. Usually, a method of repeating dewatering and water washing is used.

After removal of residues and the like, the moisture-containing polyvinyl acetal resin is optionally dried, and optionally processed into powders, granule, or pellets, and then provided as molding materials. It is preferable to reduce reaction residues of aldehyde and moisture by degassing under reduced pressure during processing into powders, granule, or pellets.

The polyvinyl acetal resin used in the present invention may contain, if necessary, various additives, for example, antioxidants, stabilizers, ultraviolet absorbers, lubricants, processing aids, antistatic agents, colorants, impact resistance aids, foaming agents, fillers, matting agents, and the like. From the standpoint of dynamic properties and surface hardness of thermoplastic resin compositions, it is preferable not to add a large amount of softener or plasticizer.

In the acrylic thermoplastic resin composition in the present invention, at least two glass transition temperatures are observed in dynamic viscoelastic measurement. One is a glass transition temperature ($Tg_{A\_P}$) ascribed to the methacrylic resin (A) in the thermoplastic resin composition, and the another is a glass transition temperature ($Tg_{B\_P}$) ascribed to the polyvinyl acetal resin (B) in the thermoplastic resin composition.

When only one glass transition temperature is observed in a thermoplastic resin composition, that is, $Tg_{A\_P}=Tg_{B\_P}$ is satisfied, it is shown that the methacrylic resin (A) and the polyvinyl acetal resin (B) in the thermoplastic resin composition are completely compatible with each other.

When $Tg_{A\_P}=Tg_A$ and $Tg_{B\_P}=Tg_B$ are satisfied, it is shown that the methacrylic resin (A) and the polyvinyl acetal resin (B) are completely incompatible with each other.

In contrast, in the acrylic thermoplastic resin composition in the present invention, the glass transition temperature $Tg_{A\_P}$ ascribed to the methacrylic resin (A) in the thermoplastic resin composition indicates a value between the glass transition temperature ($Tg_A$) of the methacrylic resin (A) alone and the glass transition temperature ($Tg_B$) of the polyvinyl acetal resin (B) alone. In other words, the relationship: $Tg_B < Tg_{A\_P} < Tg_A$ or $Tg_A < Tg_{A\_P} < Tg_B$ is satisfied. In the acrylic thermoplastic resin composition of the present invention that has $Tg_{A\_P}$ satisfying the above relationship, the methacrylic resin (A) and the polyvinyl acetal resin (B) are considered to be partly compatible with each other. In addition, in the acrylic thermoplastic resin composition of the present invention, at least the methacrylic resin (A) forms a continuous phase.

Note that in the present invention, when the methacrylic resin (A) comprises a combination of two or more methacrylic resins, either one of glass transition temperatures of the combined methacrylic resins may be used as $Tg_A$, and when the polyvinyl acetal resin (B) comprises a combination of two or more polyvinyl acetal resins, either one of glass transition temperatures of the combined polyvinyl acetal resins may be used as $Tg_B$; and the above relationship, i.e., $Tg_B < Tg_{A\_P} < Tg_A$ or $Tg_A < Tg_{A\_P} < Tg_B$ may be satisfied.

Although the detailed reason is not clear, when the methacrylic resin (A) and the polyvinyl acetal resin (B) are partly compatible with each other, heat resistance, surface hardness, and rigidity of the thermoplastic resin composition of the present invention are almost equal to those of a methacrylic resin; additionally, the thermoplastic resin composition is hardly whitened when stretched, bent, subjected to impact and/or left under heat and humidity conditions for a long period of time. Toughness, handleability, and so on, are also excellent.

However, when the methacrylic resin (A) and the polyvinyl acetal resin (B) are completely compatible with each other, surface hardness of the resin composition tends to be reduced. Further, when the methacrylic resin (A) and the polyvinyl acetal resin (B) are completely compatible with each other, and also $Tg_B < Tg_A$ is satisfied, heat resistance tends to be reduced. When the methacrylic resin (A) and the polyvinyl acetal resin (B) are completely incompatible with each other, strength is decreased and whitening occurs.

In the thermoplastic resin composition of the present invention, the mass ratio (A)/(B) of the methacrylic resin (A) to the polyvinyl acetal resin (B) is preferably 99/1 to 51/49. More preferably, the mass ratio (A)/(B) is 95/5 to 60/40, and particularly preferably 90/10 to 60/40, from the standpoint of toughness, surface hardness, and rigidity of the thermoplastic resin composition of the present invention.

When the proportion of the polyvinyl acetal resin (B) is lower than 1% by mass, the improvement effect of toughness and other dynamic properties of the thermoplastic resin composition tends to be smaller. In contrast, when the proportion of the polyvinyl acetal resin (B) is more than 49% by mass, surface hardness (and rigidity) of the thermoplastic resin composition tends to be deficient.

In a suitable embodiment of the acrylic thermoplastic resin composition of the present invention, at least one of flexural modulus measured according to JIS K7171 using a specimen of 80 mm long×10 mm wide×4 mm thick at a strain rate of 1 mm/min., and elongation modulus measured according to JIS K7162 using a 1A-type dumbbell specimen at a strain rate of 1 mm/min. is 2 GPa or more, preferably 2.5 GPa or more, and more preferably 2.7 GPa or more.

Further, a suitable embodiment of the acrylic thermoplastic resin composition of the present invention has a yield stress point when a bending test is carried out according to JIS K7171 using a specimen of 80 mm long×10 mm wide×4 mm thick at a strain rate of 1 mm/min. Note that the term "yield stress point" means the stress limit at which plastic deformation begins in a solid.

Moreover, in a suitable embodiment of the acrylic thermoplastic resin composition of the present invention, the change in haze of the composition before and after being left at a temperature of 60° C. and a humidity of 90% for 1,500 hours (the difference between the haze value before left and the haze value after left) is less than 1.0%.

The above-described acrylic thermoplastic resin composition in the present invention can be obtained by a method comprising the steps of: melt-kneading the methacrylic resin (A) and the polyvinyl acetal resin (B) at a resin temperature of 140° C. or more while applying shear at a shear rate of 100 sec 1 or more, and then cooling the kneaded product to 120° C. or lower.

In a more suitable production method, it is preferable that a stage of applying shear at a shear rate of 100 $sec^{-1}$ or more and a stage of reducing the shear rate to 50 $sec^{-1}$ or less are each repeated at least twice, in the step of melt-kneading the methacrylic resin (A) and the polyvinyl acetal resin (B) at a resin temperature of 140° C. or more.

In a method of producing the acrylic thermoplastic resin composition in the present invention, it is important to knead the methacrylic resin (A) and the polyvinyl acetal resin (B) in a molten state using a common kneading machine, such as a single-screw extruder, twin-screw extruder, Banbury mixer, Brabender, open roll, and kneader. Among these kneading machines, a twin-screw extruder is preferable because large amounts of shear force can be obtained; the methacrylic resin (A) can easily form a continuous phase; productivity is excellent; and the process in which a stage of applying shear at a shear rate of 100 $sec^{-1}$ or more and a stage of reducing the shear rate to 50 $sec^{-1}$ or less are each repeated at least twice can be easily created.

The resin temperature during melt-kneading should be 140° C. or higher, more preferably 140 to 270° C., and particularly preferably 160 to 250° C.

The rate of shear applied to the thermoplastic resin composition during melt-kneading should be 100 $sec^{-1}$ or higher, and preferably 200 $sec^{-1}$ or higher.

After melt-kneading, the kneaded product is cooled to a temperature of 120° C. or lower. It is preferable to rapidly perform cooling, compared to natural cooling. For example, a molten-state strand is cooled by immersion in a tank filled with cool water. By rapid cooling, the methacrylic resin (A) forms a continuous phase; the methacrylic resin (A) and the polyvinyl acetal resin (B) are facilitated to be partly compatible with each other; and the size of a dispersion phase becomes very small. The size of a dispersion phase is usually 1 μm or smaller, and preferably 200 nm or smaller.

The acrylic thermoplastic resin composition in the present invention may contain, if necessary, various additives, for example, antioxidants, stabilizers, lubricants, processing aids, antistatic agents, colorants, impact resistance aids, blowing agents, fillers, matting agents, and the like. From the standpoint of dynamic properties and surface hardness of thermoplastic resin compositions, it is preferable not to add a large amount of softener or plasticizer.

In addition, ultraviolet absorbers can be added for the purpose of improving weather resistance. The type of ultraviolet absorbers is not limited; however, benzotriazole ultraviolet absorbers, benzophenone ultraviolet absorbers, or triazine ultraviolet absorbers are preferable. The amount of the ultraviolet absorber added is usually 0.1 to 10% by mass, preferably 0.1 to 5% by mass, and more preferably 0.1 to 2% by mass, with respect to the amount of the thermoplastic resin composition.

The above-mentioned additives may be added to the acrylic thermoplastic resin composition in the present invention during the production of the thermoplastic resin composition or immediately before molding described later.

The acrylic thermoplastic resin composition in the present invention is used as, for example, molding materials in the form of pellets or powders. Such molding materials can be processed by extrusion molding, injection molding, vacuum molding, air compression molding, blow molding, transfer molding, rotational molding, powder slush, or other known molding methods, thereby producing various molded articles. In a suitable embodiment of the molded article in the present invention, the change in haze of the molded article before and after being left at a temperature of 60° C. and a humidity of 90% for 1,500 hours (the difference between the haze value before left and the haze value after left) is less than 1.0%.

In order to obtain molded articles that have excellent transparency, improved toughness, excellent handleability, excellent balance among toughness, surface hardness and rigidity, and also are hardly whitened when stretched, bent, subjected to impact and/or left under heat and humidity conditions for a long period of time, it is particularly preferable to process the acrylic thermoplastic resin composition in the present invention by melt extrusion molding or injection molding that apply high shear force to thermoplastic resin compositions, such as the T-die method, the calendar method, and the inflation method. In particular, the T-die method is preferably used to obtain film-like molded articles in terms of economic efficiency.

A preferred resin temperature for melt molding is 160 to 260° C. It is preferable to cool the molded article more rapidly than natural cooling after melt molding. For example, it is preferable to rapidly cool a film-like molded article by contact with cooling rolls immediately after molding. Rapidly cooling enables the production of molded articles in which the methacrylic resin (A) forms a continuous phase, and the methacrylic resin (A) and the polyvinyl acetal resin (B) are partly compatible with each other.

The acrylic thermoplastic resin composition in the present invention can be applied to various molded parts. Examples of applications of the resin compositions include advertising pillars, standing signboards, side signboards, transom signboards, roof signboards, and like signboard parts or marking films; showcases, partition panels, store displays, and like display parts; fluorescent covers, mood lighting covers, lamp shades, luminous ceilings, luminous walls, chandeliers, and like illumination parts; furniture, pendants, mirrors, and like interior parts; doors, domes, safety window glasses, partitions, stairway wainscot, balcony wainscot, roofs of leisure buildings, and like architectural parts; airplane windshields, pilot's visors, motorcycles, motorboat windshields, bus sun visors, vehicle side visors, rear visors, head wings, headlight covers, and like automobile interior parts; automobile exterior parts such as bumpers, and like transport machine-related parts; nameplates for acoustic imaging, stereo covers, television protective masks, vending machines, mobile phones, personal computers, and like electronic equipment parts; incubators, X-ray parts, and like medical equipment parts; machine covers, instrument covers, laboratory equipments, rulers, dial plates, observation windows, and like equipment-related parts; liquid crystal protection plates, light guide plates, light guide films, Fresnel lenses, lenticular lenses, front plates for various displays, diffusers, and like optical-related parts; traffic signs, guide plates, traffic mirrors, soundproof walls, and like traffic-related parts; greenhouses, large water tanks, box water tanks, bathroom materials, clock panels, bathtubs, sanitary fitments, desk mats, game parts, toys, and face protection masks during welding; surface materials for use in personal computers, mobile phones, furniture, vending machines, bathroom materials; and the like.

The use of the acrylic thermoplastic resin composition in the present invention enables the production of molded articles that are excellent in balance among toughness, surface hardness, and rigidity, as well as easy to handle due to excellent tear strength. Further, such molded articles have excellent design characteristics since they are not whitened when stretched, bent and/or subjected to impact. When film- or sheet-like molded articles comprising the acrylic thermoplastic resin composition in the present invention are laid on substrates made of steel materials, plastic sheets, woods, glasses, or the like by adhesion, lamination, insert molding, in mold process, or the like, design characteristics of the substrates can be improved, and the substrates can be protected. Design characteristics and protective properties can be further enhanced by applying a coating layer cured by irradiation with ultraviolet light (UV) or electron beam (EB) on the acrylic thermoplastic resin composition of the present invention combined with the substrate. Co-extrusion of the acrylic thermoplastic resin composition of the present invention and substrates made of steel materials, plastics, woods, glasses, or the like can enhance the design characteristics of the substrates. Moreover, taking advantage of excellent design characteristics, the acrylic thermoplastic resin composition in the present invention can suitably used in wallpapers; surface of automobile interior materials; surface of automobile exterior materials such as bumpers; surface of mobile phones; surface of furniture; surface of personal computers; surface of vending machines; surface of bathroom materials such as bathtubs; and the like.

[Acrylic Resin Molded Article (or Acrylic Resin Film)]

The acrylic resin molded article in the present invention comprises the methacrylic resin (A) and the polyvinyl acetal resin (B). The mass ratio (A)/(B) of the methacrylic resin (A) to the polyvinyl acetal resin (B) is 99/1 to 51/49. From the standpoint of toughness, i.e., handleability and surface hardness, of the acrylic resin molded article in the present invention, the mass ratio (A)/(B) is preferably 95/5 to 60/40, and more preferably 90/10 to 60/40.

When the proportion of the polyvinyl acetal resin (B) is lower than 1% by mass, toughness and like dynamic properties of the acrylic resin molded article in the present invention tend to be decreased, and handleability of the molded article tends to be worsened. In contrast, when the proportion of the polyvinyl acetal resin (B) is higher than 49% by mass, surface hardness of the acrylic resin molded article in the present invention tends to be deficient.

The acrylic resin molded article in the present invention may contain, if necessary, various additives, for example, antioxidants, stabilizers, lubricants, processing aids, antistatic agents, colorants, impact resistance aids, blowing agents, fillers, matting agents, and the like. From the standpoint of dynamic properties and surface hardness of the acrylic resin molded article in the present invention, it is preferable not to add a large amount of softener or plasticizer.

As ultraviolet absorbers to be added for the purpose of improving weather resistance, benzotriazole ultraviolet absorbers, benzophenone ultraviolet absorbers, or triazine ultraviolet absorbers are preferable. The amount of the ultraviolet absorber added is usually 0.1 to 10% by mass, preferably 0.3 to 5% by mass, and more preferably 0.3 to 2.0% by mass, with respect to the total mass of the methacrylic resin (A) and the polyvinyl acetal resin (B).

Such additives to be contained in the acrylic resin molded article of the present invention may be added to the methacrylic resin (A) and/or the polyvinyl acetal resin (B) before melt-molding; added during melt-molding the methacrylic resin (A) and the polyvinyl acetal resin (B); or added during molding a composition that contains the methacrylic resin (A) and the polyvinyl acetal resin (B). Alternatively, the above-mentioned additives may be mixed with the methacrylic resin (A) and the polyvinyl acetal resin (B), and then the mixture is directly molded into an acrylic resin molded article.

In the acrylic resin molded article in the present invention, it is preferable that the methacrylic resin (A) forms a continuous phase. Due to the formation of a continuous phase by the methacrylic resin (A), an acrylic resin molded article having good heat resistance and high surface hardness derived from the methacrylic resin (A) can be obtained. It is also preferable that a glass transition temperature $Tg_{A\ P}$ ascribed to the methacrylic resin (A) in the acrylic resin molded article indicates a value between a glass transition temperature ($Tg_A$) of the methacrylic resin (A) alone and a glass transition temperature ($Tg_B$) of the polyvinyl acetal resin (B) alone.

Roughness of at least one side of the acrylic resin molded article in the present invention is preferably 1.5 nm or less, and more preferably 0.1 to 1.0 nm. This ensures excellent handleability at the time of cutting or punching. Further, when the molded article is used in applications for which design characteristics are required, sharpness of a pattern layer printed on the acrylic resin molded article and surface gloss are excellent. Moreover, in optical applications, light transmittance and other optical properties, and shape precision in surface shaping are excellent. Note that the roughness of the molded article (film) is a value determined by the method described in EXAMPLES.

Moreover, haze of the acrylic resin molded article in the present invention is preferably 0.3% or less, and more preferably 0.2% or less, at a thickness of 100 μm. This ensures excellent handleability at the time of cutting or punching. Further, when the molded article is used in applications for which design characteristics are required, sharpness of a pattern layer printed on the acrylic resin molded article and surface gloss are excellent. Moreover, in optical applications, such as liquid crystal protection films and light guide films, utilization efficiency of light source is preferably increased. Furthermore, shape precision in surface shaping is preferably excellent.

In a suitable embodiment of the acrylic resin molded article in the present invention, the change in haze of the molded article before and after being left at a temperature of 60° C. and a humidity of 90% for 1,500 hours (the difference between the haze value before left and the haze value after left) is less than 1.0%.

The film-like acrylic resin molded article (acrylic resin film) in the present invention preferably has a thickness of 500 μm or less. A film having a thickness of more than 500 μm is not preferable since laminate properties, handling properties, cutting and punching properties, and other secondary processabilities are reduced, making the use as the film difficult; additionally, the price per unit area increases, leading to economic disadvantage. Particularly, the thickness of the film is more preferably 50 to 300 μm, and particularly preferably 75 to 200 μm.

The acrylic resin molded article in the present invention may be colored. Examples of coloring methods include, though not limited to, a method of coloring the methacrylic resin (A) and the polyvinyl acetal resin (B) themselves before molding, by mixing a pigment or colorant in a composition of these resins; a method of coloring the acrylic resin molded article by immersion in a colorant-dispersed solution; and the like.

Printing may be placed on at least one side of the acrylic resin molded article in the present invention. Pictures, texts, graphics, and other patterns, and colors can be applied by printing. Patterns may be chromatic or achromatic. In order to preserve the color of a printed layer, it is preferable to place printing on the side in contact with other thermoplastic resins and/or thermosetting resins, which are described later.

In the acrylic resin molded article in the present invention, the hardness of the surface is preferably HB or harder, more preferably F or harder, and even more preferably H or harder by JIS pencil hardness (100 µm thick). Since film-like molded articles with a hard surface are hardly scratched, they are suitably used in decorative and protective films for the surface of molded products for which design characteristics are required.

The acrylic resin molded article in the present invention can be obtained by an arbitrary molding method that is selected according to the desired shape of the molded article. When the acrylic resin molded article takes the form of a film, it can be molded by a common method, such as the T-die method, the inflation method, the melt casting method, and the calendar method. From the standpoint of obtaining film-like molded articles having good surface smoothness, good specular gloss, and low haze, the preferred is a method including the steps of extruding the above melt-kneaded product from a T-die in a molten state, and bringing both sides of the extruded product into contact with the surface of mirror-finished rolls or mirror-finished belts for shape forming. Rolls or belts used in this method are preferably made of metal. When both sides of the melt-kneaded product extruded in this way are brought into contact with mirror-finished surfaces for molding, it is preferable that the molded article is sandwiched and pressurized between mirror-finished rolls or mirror-finished belts. The sandwiching pressure of the mirror-finished rolls or the mirror-finished belts is preferably higher. In terms of linear pressure, it is preferably 10 N/mm or more, and more preferably 30 N/mm or more.

Further, from the standpoint of obtaining an acrylic resin molded article having good surface smoothness, good specular gloss, and low haze, it is preferable that at least one surface temperature of mirror-finished rolls or mirror-finished belts that sandwich the acrylic resin molded article is adjusted to about 60° C. or higher, and also both surface temperatures of the mirror-finished rolls or the mirror-finished belts that sandwich the molded article are adjusted to 130° C. or lower. When both surface temperatures of the mirror-finished rolls or the mirror-finished belts sandwiching the molded article is lower than 60° C., the obtained acrylic resin molded article tends to have insufficient surface smoothness and haze. When at least one surface temperature is higher than 130° C., the molded article is excessively adhered to the mirror-finished rolls or the mirror-finished belts. Thus, when the acrylic resin molded article is peeled off from the mirror-finished rolls or the mirror-finished belts, the surface of the molded article is easily impaired. As a result, the obtained acrylic resin molded article tends to have lower surface smoothness or high haze.

The acrylic resin molded article in the present invention can be obtained by a method of melt-kneading the above-mentioned methacrylic resin (A) and polyvinyl acetal resin (B) in the above-mentioned range of mass ratio ((A)/(B)), and then molding the kneaded product. Preferably, the method includes the step of melt-kneading the methacrylic resin (A) and the polyvinyl acetal resin (B) at a resin temperature of 140° C. or higher while applying shear at a shear rate of 100 $sec^{-1}$ or more, and then cooling the kneaded product to 120° C. or lower.

In a more suitable method, it is preferable that in the step of melt-kneading the methacrylic resin (A) and the polyvinyl acetal resin (B) at a resin temperature of 140° C. or more, a stage of applying shear at a shear rate of 100 $sec^{-1}$ or more and a stage of reducing the shear rate to 50 $sec^{-1}$ or less are each repeated at least twice. Through these steps, an acrylic resin molded article in which at least the methacrylic resin (A) forms a continuous phase can be obtained.

Any methods can be used as long as they include the above-mentioned steps. For example, the methacrylic resin (A) and the polyvinyl acetal resin (B) are melt-kneaded at a resin temperature of not less than 140° C. using a common kneading machine, such as a single-screw extruder, twin-screw extruder, Banbury mixer, Brabender, open roll, and kneader, while applying shear at a shear rate of 100 $sec^{-1}$ or more (preferably repeating at least twice each of the stages of applying shear at a shear rate of 100 $sec^{-1}$ or more, and then reducing the shear rate to 50 $sec^{-1}$ or less); thereafter rapidly cooled to 120° C. or lower, the mixture is optionally cut into a pellet shape, and formed into films or other molded articles. Alternatively, a mixture of the methacrylic resin (A) and the polyvinyl acetal resin (B) is melt-kneaded at a resin temperature of not less than 140° C. while applying shear at a shear rate of 100 $sec^{-1}$ or more (preferably repeating at least twice each of the stages of applying shear at a shear rate of 100 $sec^{-1}$ or more, and then reducing the shear rate to 50 $sec^{-1}$ or less); thereafter rapidly cooled to 120° C. or lower to be molded into films or other molded articles.

Among these production methods, it is preferable to melt-kneading the resins using a twin-screw extruder, cooling the kneaded product, optionally cutting into a pellet shape, and then forming the pellet into a film, since large shear force can be obtained, the methacrylic resin (A) easily forms a continuous phase, and stability and handleability are excellent. The resin temperature during melt-kneading is preferably 140° C. or higher, more preferably 160° C. or higher, and particularly preferably 180° C. or higher. Moreover, from the standpoint of preventing degradation of the methacrylic resin (A) and the polyvinyl acetal resin (B), the resin temperature is preferably 300° C. or lower, and more preferably 280° C. or lower.

During melt-kneading, shear is preferably applied at a shear rate of 100 $sec^{-1}$ or higher, and particularly preferably 200 $sec^{-1}$ or higher. In the production of pellets of the above-mentioned mixture, after the mixture is melted at a resin temperature of 140° C. or more while applying shear at 100 $sec^{-1}$ or higher, and then cooled to 120° C. or less; the mixture may again, but not necessarily, be melted at a resin temperature of 140° C. or more while applying shear at 100 sec 1 or higher during forming into films etc.

The acrylic resin molded article (acrylic resin film) in the present invention is preferably obtained by a method of melt-kneading the acrylic thermoplastic resin composition of the present invention for molding.

(Laminated Film)

The acrylic resin film in the present invention may be a single-layer film or a laminated film (or a laminated body). Such laminated films (or laminated bodies) may be obtained by laminating the acrylic thermoplastic resin composition of the present invention, and other resins, a wood substrate, or a substrate composed of kenaf or other non-wood fibers.

Such laminated films may also be obtained by laying at least one layer of other thermoplastic resin directly or through an adhesion layer on at least one side of the above-mentioned acrylic resin film of the present invention.

Examples of other thermoplastic resins suitable for lamination include polycarbonate resins, polyethylene terephthalate resins, polyamide resins, polyethylene resins, polypropylene resins, polystyrene resins, polyvinyl chloride resins, other (meth)acrylic resins, ABS (acrylonitrile-butadiene-styrene copolymer) resins, and the like.

The method of producing laminated films is not limited. For example, laminated films can be produced by the following methods: (1) The acrylic resin film of the present invention and a film of other thermoplastic resin are separately prepared, and they are continuously laminated between heating rolls, thermally compressed by a press, laminated simultaneously with air-compression or vacuum molding, or laminated with interposition of an adhesion layer (wet lamination); (2) The acrylic resin film of the present invention is used as a substrate, and other thermoplastic resin melt-extruded from a T-die is laminated on the substrate; or (3) A mixture of the above-mentioned methacrylic resin (A) and the above-mentioned polyvinyl acetal resin (B), and other thermoplastic resin are co-extruded, thereby obtaining a film in which a layer of the acrylic resin film of the present invention and a layer of the other thermoplastic resin film are laminated.

In the method (1) or (2) among these, corona treatment or other surface treatment may be conducted on the laminating surface of the acrylic resin film of the present invention or other thermoplastic resin film before lamination.

In the laminated film of the present invention, the acrylic thermoplastic resin composition of the present invention may be used in the inner layer or parts of the inner layer, and in the outermost layer as well. The number of laminated layers of the film is not limited. As other resins used in the laminated film, methacrylic resins and other transparent resins are preferable in terms of design characteristics of the film. From the viewpoint that films are resistant to scratch, and that design characteristics are stable over a long period of time, resin materials having high surface hardness and weather resistance, for example, methacrylic resins or the acrylic thermoplastic resin compositions of the present invention are preferably used in the outermost layer.

Making use of good handleability, good surface smoothness, and high surface hardness, the acrylic resin molded article (film) or the laminated film in the present invention is suitably used in molded products for which design characteristics are required and molded products for which high optical properties are required.

(Acrylic Resin Composite)

The acrylic resin composite in the present invention comprises an acrylic resin molded article (an acrylic resin film) comprising the methacrylic resin (A) and the polyvinyl acetal resin (B), and a layer of metal and/or metal oxide laid on at least one side of the above article.

At least one side of the acrylic resin molded article, specifically the side on which a metal and/or metal oxide layer is laid, preferably has a roughness of 1.5 nm or less, and more preferably 0.1 to 1.0 nm. It is even more preferable that both sides of the acrylic resin molded article have a roughness of 1.5 nm or less. When a metal and/or metal oxide layer is laid on the surface having a roughness in this range, the roughness of the surface of the metal and/or metal oxide layer is smaller, and thus a composite with excellent luster can be obtained. Moreover, even when a layer of metal and/or metal oxide with reduced thickness is laid on the article, the composite is excellent in luster, and thus is economically advantageous. Furthermore, the composite comprising a layer of metal and/or metal oxide laid on the article has fewer cracks when cut or punched, and thus is excellent in handleability. Note that the roughness of the composite is a value determined by the method described in EXAMPLES.

The acrylic resin molded article used in the composite in the present invention preferably has a thickness of 500 µm or less. When the thickness is more than 500 µm, laminate properties, handling properties, cutting and punching properties, and other secondary processabilities tend to be reduced; additionally, the price per unit area tends to increase, leading to economic disadvantage. Particularly, the thickness of the acrylic resin molded article is more preferably 50 to 300 µm, and even more preferably 75 to 200 µm.

The acrylic resin molded article used in the composite in the present invention may be colored. Examples of coloring methods include, though not limited to, a method of coloring the methacrylic resin (A) and the polyvinyl acetal resin (B) themselves before molding, by mixing a pigment or colorant in a mixture of these resins; a method of coloring the acrylic resin molded article by immersion in a colorant-dispersed solution; and the like.

Printing may be placed on at least one side of the acrylic resin molded article used in the composite in the present invention. Pictures, texts, graphics, and other patterns, and colors can be applied by printing. Patterns may be chromatic or achromatic. In order to preserve the color of the printed layer, it is preferable to place printing on the side in contact with other thermoplastic resins and/or thermosetting resins, which are described later.

The surface of the acrylic resin molded article (acrylic resin film) used in the composite in the present invention preferably has a JIS pencil hardness of H or harder.

As the acrylic resin molded article used in the composite in the present invention, those in which at least one other thermoplastic resin layer is formed on at least one surface directly or via an adhesion layer (e.g., the above-mentioned laminated films) may be also mentioned.

Examples of other thermoplastic resins suitable for lamination include polycarbonate resins, polyethylene terephthalate resins, polyamide resins, polyethylene resins, polypropylene resins, polystyrene resins, polyvinyl chloride resins, other (meth)acrylic resins, ABS (acrylonitrile-butadiene-styrene copolymer) resins, and the like.

The method of laminating other thermoplastic resin layers is not limited. For example, other thermoplastic resin layers can be laminated by the following methods: (1) The acrylic resin molded article and a thermoplastic resin molded article are separately prepared, and they are continuously laminated between heating rolls, thermally compressed by a press, laminated simultaneously with air-compression or vacuum molding, or laminated with interposition of an adhesion layer (wet lamination); (2) The acrylic resin molded article is used as a substrate, and other thermoplastic resin melt-extruded from a T-die is laminated on the substrate; or (3) A mixture of the above-mentioned methacrylic resin (A) and the above-mentioned polyvinyl acetal resin (B), and other thermoplastic resin are co-extruded. In the method (1) or (2) among these, corona treatment or other surface treatment may be performed on the laminating surface of the acrylic resin molded article or other thermoplastic resin molded article.

Examples of metals used in the metal layer of the composite include aluminum, silicon, magnesium, palladium, zinc, tin, nickel, silver, copper, gold, indium, stainless steel, chromium, titanium, and so on.

Examples of metal oxides used in the metal oxide layer include aluminum oxide, zinc oxide, antimony oxide, indium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, barium oxide, and so on. These metals and metal oxides may be used singly or in combination of two or more.

Among these, indium is preferable since it has excellent design characteristics, and luster is hardly lost when the composite is subjected to deep-draw molding. Aluminum is particularly preferable when deep drawing is not required, since it has excellent design characteristics and is industrially available at low cost.

Layers of these metals and/or metal oxides are usually formed by a vacuum deposition method; however, other methods such as ion plating, sputtering, and CVD (Chemical Vapor Deposition) can also be used. Deposited films formed of metal and/or metal oxide generally have a thickness of about 5 to 100 nm. When deep-draw molding is performed after layer forming, the thickness is preferably 5 to 250 nm.

As the acrylic resin molded article has higher surface smoothness, the adhesion between a metal and/or metal oxide layer and the acrylic resin is improved, and thus they are hardly peeled off at this interface. Moreover, when the acrylic resin molded article has high surface smoothness, a composite having design characteristic such as good luster can be produced even using a thinner metal and/or metal oxide layer. Poor surface smoothness tends to cause the lack of metallic luster when a metal and/or metal oxide layer is thinned. Thus, when the roughness of the acrylic resin molded article varies depending on the surface, it is preferable to form a metal and/or metal oxide layer on a surface with minimum roughness (excellent surface smoothness), specifically, a surface with a roughness of preferably 1.5 nm or below, and more preferably 0.1 to 1.0 nm.

Making use of good surface smoothness, high surface hardness, good specular gloss and handleability, the acrylic resin composite in the present invention is employed in goods for which design characteristics are required.

(Laminated Body)

The laminated body in the present invention comprises other thermoplastic resins and/or thermosetting resins, and the acrylic resin molded article (acrylic resin film) of the present invention, the laminated film of the present invention or the acrylic resin composite of the present invention laid on the surface of the resin.

Examples of other thermoplastic resins used in the laminated body include polycarbonate resins, polyethylene terephthalate resins, polyamide resins, polyethylene resins, polypropylene resins, polystyrene resins, polyvinyl chloride resins, other (meth)acrylic resins, ABS (acrylonitrile-butadiene-styrene copolymer) resins, and the like. Examples of other thermosetting resins include epoxy resins, phenolic resins, melamine resins, and the like.

The method of producing the laminated body in the present invention is not limited. For example, the laminated body of the present invention can be obtained by forming the acrylic resin film of the present invention, the laminated film of the present invention, or the film-like composite of the present invention on the surface of other thermoplastic resins and/or thermosetting resins by vacuum molding, air-compression molding, compression molding, insert molding or in-mold process under heating. In the laminated body of the present invention, the acrylic resin film of the present invention, or the laminated film or film-like composite of the present invention is disposed in the uppermost surface of the laminated body. Therefore, surface smoothness, surface hardness, luster, and other properties of the laminated body are excellent, and further patterns and the like printed on the acrylic resin films are clearly displayed.

Among methods for producing the laminated body in the present invention, a generally-called injection-molding simultaneous lamination method is preferable.

In the injection-molding simultaneous lamination method, the acrylic resin film of the present invention or the laminated film or film-like composite of the present invention is inserted between male and female dies in an injection mold; a molten thermoplastic resin is injected into one side of the film in the mold to form an injection-molded article and to stick simultaneously the above film, laminated film, or film-like composite on the molded article.

Other preferable method of producing the laminated body in the present invention is a generally-called insert molding method.

In the insert molding method, the acrylic resin film of the present invention, the laminated film of the present invention, or the film-like composite of the present invention is preformed in a discrete molding machine, and then inserted between male and female dies in an injection mold; a molten thermoplastic resin is injected into one side of the film, laminated film or film-like composite in the injection mold to form a molded article and to stick the above film, laminated film, or film-like composite on the molded article.

When using the laminated film of the present invention as the film used in the injection-molding simultaneous lamination method or insert molding method, it is preferable to place the acrylic resin film so as to form the uppermost surface.

When using the composite of the present invention as the film used in the injection-molding simultaneous lamination method or insert molding method, the side of the metal and/or metal oxide layer of the composite is placed at the side of a resin formed by molding; that is, the metal or metal oxide layer is sandwiched between the acrylic resin and a resin formed by molding.

In the thus obtained laminated body, the acrylic resin molded article (acrylic resin film) or the composite is disposed in the uppermost surface thereof, and hence the laminated body is excellent in surface smoothness, surface hardness, luster as well as depth effect.

Specific examples of the acrylic resin molded article, acrylic resin film, laminated film, or composite of the present invention include advertising pillars, standing signboards, side signboards, transom signboards, roof signboards, and like signboard parts; showcases, partition panels, store displays, and like display parts; fluorescent covers, mood lighting covers, lamp shades, luminous ceilings, luminous walls, chandeliers, and like illumination parts; furniture, pendants, mirrors, and like interior parts; doors, domes, safety window glasses, partitions, stairway wainscot, balcony wainscot, roofs of leisure buildings, and like architectural parts; airplane windshields, pilot's visors, motorcycles, motorboat windshields, bus sun visors, vehicle side visors, rear visors, head wings, headlight covers, automobile interior materials, automobile exterior materials such as bumpers, and like transport machine-related parts; nameplates for acoustic imaging, stereo covers, television protective masks, vending machines, mobile phones, personal computers, and like electronic equipment parts; incubators, X-ray materials, and like medical equipment parts; machine covers, instrument covers, laboratory equipments, rulers, dial plates, observation windows, and like equipment-related parts; traffic signs, guide plates, traffic mirrors, soundproof walls, and like traffic-related parts; greenhouses, large water tanks, box water tanks, bathroom materials, clock panels, bathtubs, sanitary fitments, desk mats, game parts, toys, decorative films and protective films on the surface of face protection masks during welding, etc., and wallpapers; marking films; liquid crystal protection films, light guide films, Fresnel lenses, lenticular lenses, front films and diffusion films for various displays, and like optical-related parts; and the like.

EXAMPLES

The present invention is described in more detail below; however the present invention is not limited thereto. Note that the terms "part" and "%" mean "part by mass" and "% by mass", respectively, unless otherwise specified.

The properties of the molding materials including the thermoplastic resin compositions were evaluated in the following manner.

(1) Weight Average Molecular Weight

Using tetrahydrofuran as a solvent, Shodex (trade name) GPC SYSTEM 11 (manufactured by Showa Denko K.K.) was connected with Shodex (trade name) KF-806L as a gel permeation chromatography column, and Shodex (trade name) differential refractive index detector RI-101 was used as a detector. A sample solution was prepared by precisely weighing 3 mg of polymer, dissolving in 3 ml of tetrahydrofuran, and filtering through a 0.45-μm membrane filter. The flow rate on the measurement was 1.0 ml/min., and weight average molecular weight (Mw) was calculated as molecular weight in terms of polymethyl methacrylate based on a calibration curve generated with standard polymethyl methacrylate manufactured by Polymer Laboratories.

(2) Flexural Modulus, Yield Point Elongation, Fracture Elongation, Toughness, and Observation of Whitened State in Bending Test Flexural modulus, yield point elongation, and fracture elongation in a bending test were measured according to JIS K7171 by means of an autograph (AG-5000B; manufactured by Shimadzu Corporation) and a specimen 80 mm long×10 mm wide×4 mm thick obtained by injection molding. The strain rate was 1 mm/min.

Toughness was evaluated by the energy required until the specimen was fractured.

Whitened state was evaluated by visually observing the whitened state of the specimen at a bending strain of 20%. The evaluation criteria were as follows.

The length of the whitened area along the length of the specimen was not less than 2 mm: x, not less than 0.3 mm and less than 2 mm: Δ, less than 0.3 mm: ○; and there was no whitened area: ◎.

(3) Elongation Modulus, Fracture Elongation, Toughness, and Observation of Whitened State in Tension Test Elongation modulus in a tension test was measured according to JIS K7162 by means of an autograph (AG-5000B; manufactured by Shimadzu Corporation) and a 1A-type dumbbell specimen obtained by injection molding. The strain rate was 1 mm/min.

Fracture elongation, toughness, and whitened state were measured according to JIS K7162 by means of an autograph (AG-5000B; manufactured by Shimadzu Corporation) and a 1A-type dumbbell specimen obtained by injection molding. The strain rate was 5 mm/min.

Toughness was evaluated by the energy required until the specimen was fractured.

Whitened state was evaluated by visually observing the whitened state of the specimen at a tensile strain of 10%. The evaluation criteria were as follows. The length of the whitened area along the length of the specimen was not less than 10 mm: x, not less than 1 mm and less than 10 mm: Δ, less than 1 mm: ○; and there was no whitened area: ◎.

(4) Glass Transition Temperature (Tg)

A peak temperature (Tg) of primary dispersion of loss tangent (tan δ) was measured using EXSTAR6000DMS (manufactured by SII NanoTechnology Inc.) and a rectangular specimen 60 mm long×10 mm wide×4 mm thick that was cut from a specimen obtained by injection molding. The measurement conditions were as follows. In the bending mode (doubly-supported beam measurement), the sinusoidal oscillation was 10 Hz, and the temperature rising rate was 3° C./min.

(5) Surface Hardness of Thermoplastic Resin Composition

Rockwell hardness (M scale) was measured according to JIS K7202-2 using a flat plate 100 mm×100 mm×4 mm thick obtained by injection molding.

(6) Haze of Thermoplastic Resin Composition

Haze of a 4-mm thick specimen was measured according to JIS K7136.

(7) Morphological Observation by Transmission Electron Microscope

An ultrathin section was prepared using an ultramicrotome (Reichert ULTRACUT-S; manufactured by RICA) from a specimen obtained by injection molding. Then, the polyvinyl acetal part in the thermoplastic resin composition was electronically stained with ruthenium tetroxide vapor to produce a sample. The morphology of the thus prepared sample was observed under a transmission electron microscope (H-800NA; manufactured by Hitachi, Ltd.). The observed morphology was evaluated as follows. The non-stained area (the methacrylic resin (A)) formed a continuous phase: ○, and the methacrylic resin (A) was discontinuous: x.

(8) Wet Heat Resistance

A plate 100 mm×100 mm×4 mm thick obtained by injection molding was left to stand at 60° C. at 95% RH for 1500 hours. The wet heat resistance was evaluated with haze difference (ΔH) at a thickness of 4 mm before and after the treatment.

[Methacrylic Resin]

Methacrylic resins each containing a methyl methacrylate unit and a methyl acrylate unit at a ratio shown in Table 1 were prepared by bulk polymerization. The weight average molecular weight (Mw) and glass transition temperature (Tg) of the prepared methacrylic resins are shown in Table 1.

[Tab. 1]

TABLE 1

|  | Methyl methacrylate unit [mass %] | Methyl acrylate unit [mass %] | Weight average molecular weight (Mw) | Tg [° C.] |
| --- | --- | --- | --- | --- |
| A-1 | 91 | 9 | 100,000 | 121 |
| A-2 | 92 | 8 | 45,000 | 116 |
| A-3 | 92 | 8 | 15,000 | 116 |
| A-4 | [Comp. Ex. 4] | | | |
| A-5 | [Comp. Ex. 5] | | | |
| A-6 | 97 | 3 | 90,000 | 135 |
| A-7 | 97.6 | 2.4 | 120,000 | 140 |

[Polyvinyl Acetal Resin]

An aldehyde compound and an acid catalyst (hydrochloric acid) were added to an aqueous solution in which a polyvinyl alcohol resin was dissolved. The mixture was stirred and acetalized to precipitate resin. The precipitated resin was washed according to a standard procedure until the pH reached 6. Then, the resin was suspended in an alkalified aqueous medium, and after-treated by stirring. Thereafter, the resin was washed again until the pH reached 7, and dried until the volatile content reached 1.0%. Thus, polyvinyl acetal resins shown in Table 2 were obtained.

The acetalization degree of the polyvinyl acetal resin was determined by the following procedure.

First, according to the method described in JIS K6728 (1977), the mass ratio of vinyl alcohol unit ($l_0$)) and the mass ratio of vinyl acetate unit ($m_0$)) were determined by the method described later. Further, the mass ratio of vinyl acetal unit ($k_0$) was calculated by the formula: $k_0=1-l_0-m_0$.

Next, the calculations:

$l=(l_0/44.1)/(l_0/44.1+m_0/86.1+2\times k_0/Mw(acetal))$ and $m=(m_0/86.1)/(l_0/44.1+m_0/86.1+2\times k_0/Mw(acetal))$ were performed. Then, the vinyl acetal unit ratio ($k=k_{(1)}+k_{(2)}+\ldots+k_{(n)}$) was calculated by the formula: $k=1-l-m$. Finally, the acetalization degree (mol %) was calculated by the formula: $[k_{(1)}+k_{(2)}+\ldots+k_{(n)}]\times 2/[[k_{(1)}+k_{(2)}+\ldots+k_{(n)}]\times 2+l+m]\times 100$.

Here, Mw(acetal) is the molecular weight per acetalization unit. For example, polyvinyl butyral satisfies Mw(acetal)= Mw(butyral)=142.2.

Moreover, when butyl aldehyde and other aldehyde are co-acetalized, $^1$H-NMR or $^{13}$C-NMR spectrum can be measured to calculate each acetalization degree (mol %).

[Determination of $l_0$ and $m_0$]

About 0.4 g of polyvinyl acetal resin was accurately weighed into a conical flask with stopper, and 10 ml of a mixed liquid of pyridine and acetic anhydride (volume ratio of 92:8) was added with a pipette and dissolved. Attaching a condenser, the mixture was heated on a water bath at 50° C. for 120 minutes. After cooling, 20 ml of dichloroethane was added and well shaken. Further adding 50 ml of water, the flask was stoppered and vigorously shaken. Thereafter, the mixture was left to stand for 30 minutes. While vigorously shaking, the generated acetic acid was titrated with N/2 sodium hydroxide solution using phenolphthalein as an indicator until a faint pink color developed. The titre thereof is used as a (ml). Separately, a blank test was performed. The titre of N/2 sodium hydroxide solution required for the blank test was used as b (ml). Then, l0 was determined by the following formula:

$l_0=2.2\times(b-a)\times F_1/(s_1\times P_1)$ wherein $s_1$ is the mass of polyvinyl acetal resin; $P_1$ is pure content (%); and $F_1$ is the titer of N/2 sodium hydroxide solution.

Further, about 0.4 g of polyvinyl acetal resin was accurately weighed into a conical flask with stopper, and 25 ml of ethanol was added and dissolved at 85° C. N/10 sodium hydroxide solution (5 ml) was added with a pipette while shaking. Attaching a condenser, the mixture was refluxed in a water bath at 85° C. for 60 minutes. After cooling, 5 ml of N/10 hydrochloric acid was added with a pipette and well shaken. Then, the mixture was left to stand for 30 minutes. Excess hydrochloric acid was titrated with N/10 sodium hydroxide solution using phenolphthalein as an indicator until a faint pink color developed. The titre thereof was used as c (ml). Separately, a blank test was performed. The titre of N/10 sodium hydroxide solution required for the blank test was used as d (ml). Then, $m_0$ was determined by following formula:

$m_0=0.86\times(c-d)\times F_m/(s_m\times P_m)$ wherein $s_m$ is the mass of polyvinyl acetal resin; $P_m$ is pure content (%); and $F_m$ is the titer of N/10 sodium hydroxide solution.

[Tab. 2]

TABLE 2

| | Aldehyde compound | Proportion of repeating unit of polyvinyl acetal (mol %) | | | Number average polymerization degree | Saponification degree [mol %] | Tg [° C.] |
|---|---|---|---|---|---|---|---|
| | | Acetal unit | Vinyl alcohol unit | Vinyl Acetate unit | | | |
| B-1 | butyl aldehyde | 62 | 37 | 1 | 1,000 | 99 | 78 |
| B-2 | butyl aldehyde | 71 | 27 | 2 | 1,000 | 98 | 75 |
| B-3 | butyl aldehyde | 78 | 21 | 1 | 1,000 | 99 | 71 |
| B-4 | butyl aldehyde | 60 | 38 | 2 | 250 | 98 | 76 |
| B-5 | n-octyl aldehyde | 58 | 41 | 1 | 1,000 | 99 | 60 |
| B-6 | n-octyl aldehyde | 75 | 24 | 1 | 1,000 | 99 | 45 |

Example 1

By a twin-screw kneading extruder (TEX-44α (L/D=40); manufactured by The Japan Steel Works, Ltd.) at a cylinder temperature of 220° C. and a screw rotation speed of 200 rpm, 90 parts of the methacrylic resin (A-1) and 10 parts of polyvinyl acetal resin (B-1) were kneaded to obtain pellets of thermoplastic resin composition. The resin temperature measured in front of the die of the extruder was 232° C. The maximum shear rate in the extruder was 300 sec$^{-1}$, and the shear rate in the part where the clearance between barrel and screw element was large was 45 sec 1. A screw configured to be able to alternately apply shear at 300 sec 1 and shear at 45 sec$^{-1}$ twice at a rotation speed in the above range was used.

The obtained thermoplastic resin composition pellets were injection-molded using J50E2 (manufactured by The Japan Steel Works, Ltd.) at a cylinder temperature of 240° C. Thus, a plastic JIS 1A-type dumbbell specimen, a rectangular specimen 80 mm long×10 mm wide×4 mm thick, and a plate specimen 100 mm×100 mm×4 mm thick were obtained. In addition, a rectangular specimen 60 mm long×10 mm wide×4 mm thick was obtained by cutting the rectangular specimen 80 mm long×10 mm wide×4 mm thick.

Using these specimens, flexural modulus, fracture elongation, toughness, and whitened state in a bending test; elongation modulus, fracture elongation, toughness, and whitened state in a tension test; the glass transition temperature ($Tg_{AP}$) ascribed to the methacrylic resin (A) in the thermoplastic resin composition, surface hardness, haze, and wet heat resistance were measured. Table 3 shows the results. Further, morphology was observed. Table 3 shows the results.

Comparative Example 1

A specimen was produced in the same manner as in EXAMPLE 1 except that pellets consisting only of the methacrylic resin (A-1) were used in place of the thermoplastic resin composition pellets used in Example 1. Table 3 shows the results.

Examples 2 to 7

Thermoplastic resin composition pellets were obtained in the same manner as in EXAMPLE 1 except that the type and/or amount of the methacrylic resin (A) and the polyvinyl acetal resin (B) were changed as shown in Table 3. A specimen was produced using these pellets. Table 3 shows the results.
[Tab. 3]

In EXAMPLE 2, the resin temperature of the thermoplastic resin composition measured in the front of the die of the extruder was 233° C.

In EXAMPLE 3, the resin temperature of the thermoplastic resin composition measured in the front of the die of the extruder was 232° C.

In EXAMPLE 4, the resin temperature of the thermoplastic resin composition measured in the front of the die of the extruder was 231° C.

In EXAMPLE 5, the resin temperature of the thermoplastic resin composition measured in the front of the die of the extruder was 230° C.

In EXAMPLE 6, the resin temperature of the thermoplastic resin composition measured in the front of the die of the extruder was 229° C.

In EXAMPLE 7, the resin temperature of the thermoplastic resin composition measured in the front of the die of the extruder was 230° C.

TABLE 3

|  | Ex. 1 | Ex. 2 | Ex. 3 | Ex. 4 | Ex. 5 | Ex. 6 | Ex. 7 | Comp. Ex. 1 |
|---|---|---|---|---|---|---|---|---|
| Methacrylic resin [parts] | | | | | | | | |
| A-1 | 90 | 75 | 60 | 75 | 75 | 75 | 75 | 100 |
| Polyvinyl acetal resin [parts] | | | | | | | | |
| B-1 | 10 | 25 | 40 | — | — | — | — | — |
| B-2 | — | — | — | 25 | — | — | — | — |
| B-3 | — | — | — | — | 25 | — | — | — |
| B-5 | — | — | — | — | — | 25 | — | — |
| B-6 | — | — | — | — | — | — | 25 | — |
| Bending test | | | | | | | | |
| Flexural modulus [MPa] | 3000 | 2900 | 2800 | 2800 | 2700 | 2300 | 2200 | 3000 |
| Yield point elongation [%] | 8.3 | 7.1 | 6.7 | 6.9 | 6.6 | 7.0 | 7.6 | No yield point |
| Fracture elongation [%] | Not fractured | Not fractured | Not fractured | Not fractured | Not fractured | Not fractured | Not fractured | 6 |
| Toughness [J] | >2 | >2 | >2 | >2 | >2 | >2 | >2 | 1.2 |
| Whitened state | ◎ | ◎ | ◎ | ◎ | ○ | ◎ | ○ | ◎ |
| Tension test | | | | | | | | |
| Elongation modulus [MPa] | 2800 | 2800 | 2700 | 2600 | 2600 | 2200 | 2100 | 2900 |
| Fracture elongation [%] | 25 | 40 | 66 | 42 | 31 | 46 | 38 | 12 |
| Toughness [J] | 50 | 82 | 132 | 89 | 64 | 76 | 65 | 30 |
| Whitened state | ◎ | ◎ | ◎ | ◎ | ○ | ◎ | ○ | ◎ |
| Glass transition temperature | | | | | | | | |
| $Tg_A$ [° C.] | 121 | 121 | 121 | 121 | 121 | 121 | 121 | 121 |
| $Tg_{AP}$ [° C.] | 119 | 118 | 116 | 118 | 118 | 118 | 118 | 121 |
| $Tg_B$ [° C.] | 78 | 78 | 78 | 75 | 71 | 60 | 45 | — |
| Surface hardness [HRP] | 88 | 83 | 74 | 81 | 78 | 74 | 72 | 94 |
| Haze [%] | 1.0 | 1.2 | 1.3 | 1.4 | 3.0 | 1.3 | 3.5 | 0.6 |
| Morphology | ○ | ○ | ○ | ○ | ○ | ○ | ○ | — |
| Wet heat resistance [ΔH] [%] | 0.1 | 0.1 | 0.2 | 0.1 | 0.1 | 0.1 | 0.1 | 0 |

Example 8

Thermoplastic resin composition pellets were obtained in the same manner as in EXAMPLE 1 except that the prescription was changed to 75 parts of methacrylic resin (A-2) and 25 parts of polyvinyl acetal resin (B-1).
A specimen was produced using these pellets. Table 4 shows the results. The resin temperature of the thermoplastic resin composition measured in the front of the die of the extruder was 225° C.

Example 9

Thermoplastic resin composition pellets were obtained in the same manner as in EXAMPLE 1 except that the prescription was changed to 75 parts of methacrylic resin (A-3) and 25 parts of polyvinyl acetal resin (B-1). A specimen was produced using these pellets. Table 4 shows the results. In this time, the cylinder temperature during the production of the pellets was adjusted to 180° C. The resin temperature of the thermoplastic resin composition measured in the front of the die of the extruder was 225° C.

Example 10

Thermoplastic resin composition pellets were obtained in the same manner as in EXAMPLE 1 except that the prescription was changed to 75 parts of methacrylic resin (A-1) and 25 parts of polyvinyl acetal resin (B-4). A specimen was produced using these pellets. Table 4 shows the results. The resin temperature of the thermoplastic resin composition measured in the front of the die of the extruder was 231° C.

Example 11

Thermoplastic resin composition pellets were obtained in the same manner as in EXAMPLE 1 except that the prescription was changed to 75 parts of methacrylic resin (A-6) and 25 parts of polyvinyl acetal resin (B-1). A specimen was produced using these pellets. Table 4 shows the results. The resin temperature of the thermoplastic resin composition measured in the front of the die of the extruder was 236° C.

Example 12

Thermoplastic resin composition pellets were obtained in the same manner as in EXAMPLE 1 except that the prescription was changed to 75 parts of methacrylic resin (A-7) and 25 parts of polyvinyl acetal resin (B-1). A specimen was produced using these pellets. Table 4 shows the results. The resin temperature of the thermoplastic resin composition measured in the front of the die of the extruder was 240° C.

Comparative Example 2

A specimen was produced in the same manner as in EXAMPLE 1 except that pellets consisting only of the methacrylic resin (A-2) were used in place of the thermoplastic resin composition pellets used in EXAMPLE 1, and that the temperatures in injection molding and press molding were changed to 220° C. Table 4 shows the evaluation results.

Comparative Example 3

A specimen was produced in the same manner as in EXAMPLE 1 except that pellets consisting only of the methacrylic resin (A-3) were used in place of the thermoplastic resin composition pellets used in EXAMPLE 1, and that the temperatures in injection molding and press molding was changed to 200° C. The obtained specimen was very brittle, and the properties could not be measured.

Comparative Example 4

A specimen was produced in the same manner as in EXAMPLE 1 except that pellets consisting only of the methacrylic resin (A-4: a core-shell particle-containing methacrylic resin composition comprising: 16 parts by mass of a multi-layer polymer [1] which comprises a combination of a soft polymer layer containing an alkyl acrylate unit and a hard polymer layer containing an alkyl methacrylate unit and whose outermost layer is the hard polymer layer, and 84 parts by mass of a methacrylic resin) were used in place of the thermoplastic resin composition pellets used in EXAMPLE 1. Table 4 shows the evaluation results.

Comparative Example 5

A specimen was produced in the same manner as in EXAMPLE 1 except that pellets consisting only of the methacrylic resin (A-5: a core-shell particle-containing methacrylic resin composition comprising: 28 parts by mass of a multi-layer polymer [1] which comprises a combination of a soft polymer layer containing an alkyl acrylate unit and a hard polymer layer containing an alkyl methacrylate unit and whose outermost layer is the hard polymer layer, and 72 parts by mass of a methacrylic resin) were used in place of the thermoplastic resin composition pellets used in EXAMPLE 1. Table 4 shows the evaluation results.

Comparative Example 6

Resin composition pellets were obtained in the same manner as in EXAMPLE 1 except that the amount of the methacrylic resin (A-1) was changed to 20 parts and that the amount of the polyvinyl acetal resin (B-1) was changed to 80 parts. A specimen was produced using these pellets. Table 4 shows the results. In this time, the maximum shear rate of the extruder was 300 $sec^{-1}$, and the resin temperature of the thermoplastic resin composition measured in the front of the die of the extruder was 227° C. The rate of shear in the part where shear was released (clearance between barrel and screw element in a twin-screw kneading extruder was large) was 45 $sec^{-1}$. The screw was configured such that each stage of applying shear at 300 $sec^{-1}$ and then releasing the shear at 45 $sec^{-1}$ was alternatively repeated twice.

[Tab. 4]

TABLE 4

|  | Ex. | | | | | Comp. Ex. | | | |
| --- | --- | --- | --- | --- | --- | --- | --- | --- | --- |
|  | 8 | 9 | 10 | 11 | 12 | 2 | 4 | 5 | 6 |
| Methacrylic resin [parts] | | | | | | | | | |
| A-1 | — | — | 75 | — | — | — | — | — | 20 |
| A-2 | 75 | — | — | — | — | 100 | — | — | — |
| A-3 | — | 75 | — | — | — | — | — | — | — |
| A-4 | — | — | — | — | — | — | 100 | — | — |
| A-5 | — | — | — | — | — | — | — | 100 | — |
| A-6 | — | — | — | 75 | — | — | — | — | — |
| A-7 | — | — | — | — | 75 | — | — | — | — |
| Polyvinyl acetal resin [parts] | | | | | | | | | |
| B-1 | 25 | 25 | — | 25 | 25 | — | — | — | 80 |
| B-4 | — | — | 25 | — | — | — | — | — | — |
| Bending test | | | | | | | | | |
| Flexural modulus [MPa] | 2800 | 2700 | 2900 | 2900 | 3000 | 2800 | 2400 | 2000 | 2600 |
| Yield point elongation [%] | 7.0 | 6.6 | 7.3 | 6.8 | 7.2 | No yield point | No yield point | No yield point | 5.3 |
| Fracture elongation [%] | Not fractured | Not fractured | Not fractured | Not fractured | Not fractured | 1 | Not fractured | Not fractured | Not fractured |
| Toughness [J] | >2 | >2 | >2 | >2 | >2 | 0.3 | >2 | >2 | >2 |
| Whitened state | ◎ | ◎ | ◎ | ◎ | ◎ | ◎ | X | X | ◎ |
| Tension test | | | | | | | | | |
| Elongation modulus [MPa] | 2700 | 2600 | 2800 | 2800 | 2900 | 2700 | 2200 | 1800 | 2600 |
| Fracture elongation [%] | 29 | 15 | 28 | 52 | 45 | 3 | 40 | 42 | >100 |
| Toughness [J] | 51 | 27 | 52 | 105 | 110 | 7 | 80 | 84 | >17 |
| Whitened state | ◎ | ◎ | ◎ | ◎ | ◎ | ◎ | X | X | ◎ |
| Glass transition temperature | | | | | | | | | |
| $Tg_A$ [°C.] | 116 | 116 | 121 | 135 | 140 | 116 | | | 121 |
| $Tg_{AP}$ [°C.] | 110 | 98 | 116 | 128 | 130 | 116 | 120 | 119 | ND |
| $Tg_B$ [°C.] | 78 | 78 | 76 | 78 | 78 | — | — | — | 78 |
| Surface hardness [HRP] | 82 | 76 | 82 | 87 | 92 | 92 | 80 | 66 | 52 |
| Haze [%] | 0.8 | 1.7 | 1.2 | 1.2 | 0.7 | 0.6 | 1.4 | 1.4 | 1.0 |
| Morphology | ○ | ○ | ○ | ○ | ○ | — | — | — | X |
| Wet heat resistance [ΔH] [%] | 0.1 | 0.3 | 0.2 | 0.1 | 0.1 | 0.2 | 5.2 | 8.8 | 0.4 |

ND: Not detected

The properties of the films were evaluated in the following manner.

(1) Visible Light Transmission of Film

Using a spectrophotometer (U-4100; manufactured by Hitachi High-Technologies Corporation), transmission of a 100-μm thick film at a wavelength of 380 nm to 780 nm was measured, and visible light transmission calculated according to JIS R3106 was determined.

(2) Measurement of Haze of Film

The haze of a 100-μm thick test film was measured according to JIS K7136.

(3) Elongation Modulus, Fracture Elongation, and Toughness of Film in Tension Test A plastic JIS 1A-type dumbbell test film was cut from a 100-μm thick film so as to be stretched in the MD direction in a tension test. The test was performed using an autograph (AG-5000B; manufactured by Shimadzu Corporation) at a strain rate of 5 mm/min. to measure elongation modulus, fracture elongation, and toughness of the test film. Toughness was evaluated by the energy required until the specimen was fractured.

(4) Tear Strength of Film

An unnotched angle-shaped test film according to JIS K6252 was cut. The tear strength was evaluated using an autograph (AG-5000B; manufactured by Shimadzu Corporation) on the basis of the maximum tear strength (unit: N/mm) in terms of thickness when the unnotched angle-shaped test film was torn at a tension rate of 5 mm/min. The measurement was conducted on a 100-μm thick film.

(5) Surface Hardness of Film

The pencil hardness of a 100-μm thick film was measured according to JIS K5400.

(6) Observation of Whitened State of Film

When a 100-μm thick film was bent 1800 so that a folding line was created in the TD direction, the whitened state of the film was visually evaluated. The evaluation criteria were as follows. The bent portion was not whitened: ○; the bent portion was partially whitened: Δ; and the entire bent portion was whitened: x.

(7) Morphological Observation of Film by Transmission Electron Microscope

An ultrathin section was prepared from a film by means of an ultramicrotome (Reichert ULTRACUT-S; manufactured by RICA). Then, the polyvinyl acetal part in the thermoplastic resin composition was electronically stained with ruthenium tetroxide vapor to prepare a sample. The morphology of the prepared sample was observed under a transmission electron microscope (H-800NA; manufactured by Hitachi, Ltd.). The observed morphology was evaluated as follows. The non-stained area (the methacrylic resin (A)) formed a continuous phase: ○; and the methacrylic resin (A) was discontinuous: x.

(8) Wet Heat Resistance of Film

A 100-μm thick film was treated at 60° C. at 95% RH for 1500 hours. The wet heat resistance was evaluated with haze difference (ΔH) at a thickness of 100 μm before and after the treatment.

Example 13

Using GT-40 (manufactured by PLABOR Co., Ltd.), the pellets produced in EXAMPLE 1 were extrusion-molded through a 500-mm wide T-die at a cylinder temperature and T-die temperature of 220° C. Thus, a 100-μm thick film of the thermoplastic resin composition was obtained. Table 5 shows the evaluation results of the visible light transmission, haze, elongation modulus, tensile fracture elongation, toughness, tear strength, surface hardness, whitened state, wet heat resistance, and morphology of the obtained film.

Examples 14 to 19

Films were produced in the same manner as in EXAMPLE 13 except that each of the pellets produced in EXAMPLES 2-7 was used in place of the pellets produced in EXAMPLE 1. Table 5 shows the evaluation results of the visible light transmission, haze, elongation modulus, tensile fracture elongation, toughness, tear strength, surface hardness, whitened state, wet heat resistance, and morphology of the obtained films.

Comparative Example 7

A film was produced in the same manner as in EXAMPLE 13 except that pellets consisting only of the methacrylic resin (A-1) were used in place of the pellets produced in EXAMPLE 1. Various measurements and observations were performed on the film. Table 5 shows the results. The whitened state could not be evaluated since the film was broken when bent 180°.

[Tab. 5]

TABLE 5

|  | Ex. | | | | | | | Comp. Ex. |
| --- | --- | --- | --- | --- | --- | --- | --- | --- |
|  | 13 | 14 | 15 | 16 | 17 | 18 | 19 | 7 |
| Visible light transmission [%] | 92.4 | 92.4 | 92.3 | 92.4 | 92.1 | 92.4 | 92.3 | 92.5 |
| Haze [%] | 0.1 | 0.2 | 0.3 | 0.2 | 0.8 | 0.2 | 0.3 | 0.1 |
| Tension test | | | | | | | | |
| Elongation modulus [MPa] | 3300 | 3200 | 3200 | 3200 | 3100 | 2800 | 2700 | 3500 |
| Fracture elongation [%] | 16 | 35 | 95 | 30 | 18 | 50 | 24 | 2 |
| Toughness [J] | 0.9 | 1.7 | 5.0 | 1.6 | 1.0 | 2.8 | 1.1 | 0.1 |
| Tear test | | | | | | | | |
| Tear strength [N/mm] | 75 | 150 | 155 | 145 | 120 | 145 | 110 | 40 |
| Surface hardness [pencil hardness] | H | H | H | H | F | HB | HB | H |
| Whitened state | ○ | ○ | ○ | ○ | ○ | ○ | ○ | Fractured |
| Morphology | ○ | ○ | ○ | ○ | ○ | ○ | ○ | — |
| Wet heat resistance [ΔH] [%] | 0.2 | 0.2 | 0.3 | 0.2 | 0.4 | 0.3 | 0.3 | 0.1 |

Examples 20, 21, and 22

Films were produced in the same manner as in EXAMPLE 13 except that each of the pellets produced in EXAMPLES 10, 11, and 12 was used in place of the pellets produced in EXAMPLE 1. Table 6 shows the evaluation results of the visible light transmission, haze, elongation modulus, tensile fracture elongation, toughness, tear strength, surface hardness, whitened state, wet heat resistance, and morphology of the obtained films.

Comparative Example 8

A film was intended to be produced in the same manner as in EXAMPLE 13 except that the pellets consisting only of the methacrylic resin (A-2), used in COMPARATIVE EXAMPLE 2, were used in place of the pellets produced in Example 1. However, the resin was extremely brittle, and therefore no film-like molded article was obtained.

Comparative Example 9

A film was intended to be produced in the same manner as in EXAMPLE 13 except that the pellets consisting only of the methacrylic resin (A-3), used in COMPARATIVE EXAMPLE 3, were used in place of the pellets produced in EXAMPLE 1 and the temperatures of the cylinder and T-die in the extruder were changed to 200° C. However, the resin was extremely brittle, and therefore no film-like molded article was obtained.

Comparative Examples 10 to 12

Films were produced in the same manner as in EXAMPLE 13 except that each of the pellets used in COMPARATIVE EXAMPLES 4 to 6 was used in place of the pellets produced in EXAMPLE 1. Various measurements and observations were performed on the obtained films. Table 6 shows the results.

Comparative Example 13

In 10.8 g of tetrahydrofuran, 0.9 g of the methacrylic resin (A-1) and 0.3 g of the polyvinyl acetal resin (B-1) were dissolved and stirred at 25° C. to prepare a mixture (the mass ratio of the methacrylic resin (A-1) to the polyvinyl acetal resin (B-1) was 75/25). The mixture was flow casted on a polyethylene terephthalate film, the base of which was divided into a 10 cm×10 cm square. Then, the mixture was air-dried at 25° C., and further vacuum-dried. Thus, a film having a tetrahydrofuran content of 0.03% was obtained. The thickness of the obtained film was 104 μm. In the obtained film, the glass transition temperature ($Tg_{A\ P}$) ascribed to the methacrylic resin (A) was 121° C., and the $Tg_{A\ P}$ value was equal to the $Tg_A$ value. Table 6 shows the evaluation results of the visible light transmission, haze, elongation modulus, tensile fracture elongation, toughness, tear strength, surface hardness, wet heat resistance, and morphology of the obtained film. The whitened state could not be evaluated since the film was broken when bent 180°.

Comparative Example 14

First, 4.5 g of the finely pulverized methacrylic resin (A-1) and 1.5 g of the finely pulverized polyvinyl acetal resin (B-1) were mixed, and placed between parallel plates of 20 mm radius heated at 230° C. The lower plate was fixed while the upper plate was rotated at 15 rpm, and uniform shear was applied for 10 minutes. The distance between the parallel plates was 4 mm, and there was no space between the parallel plates and the resin. On this conditions, the rate of shear applied to the resin is calculated by the formula: $2\pi \times (15/60)/(4/20) \approx 7.9$ (sec$^{-1}$). The thus melt-kneaded resin composition was hot-pressed to produce a 105-μm thick film. In the obtained film, the glass transition temperature ($Tg_{A\ P}$) ascribed to the methacrylic resin (A) was 121° C., and the $Tg_{A\ P}$ value was equal to the $Tg_A$ value.

Table 6 shows the evaluation results of the visible light transmission, haze, elongation modulus, tensile fracture elongation, toughness, tear strength, surface hardness, wet heat resistance, and morphology of the obtained film. The whitened state could not be evaluated since the film was broken when bent 180°.

[Tab. 6]

TABLE 6

|  | Ex. | | | Comp. Ex. | | | | |
| --- | --- | --- | --- | --- | --- | --- | --- | --- |
|  | 20 | 21 | 22 | 10 | 11 | 12 | 13 | 14 |
| Visible light transmission [%] | 92.4 | 92.4 | 92.4 | 92.2 | 92.2 | 92.3 | 92.4 | 92.1 |
| Haze [%] | 0.2 | 0.2 | 0.2 | 0.7 | 0.7 | 0.2 | 0.4 | 0.8 |
| Tension test |  |  |  |  |  |  |  |  |
| Elongation modulus [MPa] | 3200 | 3300 | 3300 | 2600 | 2200 | 2700 | 3000 | 2500 |
| Fracture elongation [%] | 22 | 38 | 45 | 12 | 14 | >160 | 1.7 | 2.2 |
| Toughness [J] | 1.1 | 2.0 | 2.2 | 0.6 | 0.6 | >2.9 | <0.1 | <0.1 |
| Tear test |  |  |  |  |  |  |  |  |
| Tear strength [N/mm] | 130 | 160 | 250 | 65 | 60 | 180 | 20 | 15 |
| Surface hardness [pencil hardness] | H | H | H | F | B | F | H | F |
| Whitened state | ○ | ○ | ○ | X | X | ○ | Fractured | Fractured |
| Morphology | ○ | ○ | ○ | — | — | X | ○ | ○ |
| Wet heat resistance [ΔH] [%] | 0.5 | 0.1 | 0.1 | 1.2 | 2.2 | 0.3 | 1.5 | 1.8 |

The properties of the acrylic resin film of the present invention were evaluated in the following manner.

(1) Measurement of Surface Roughness of Film and Composite

Using an atomic force microscope (SPI4000 Probe Station E-sweep Environment Control Unit; manufactured by SII NanoTechnology Inc.), surface shape was measured in the DFM mode. The probe used was S1-DF20 (back side: Al; manufactured by SII NanoTechnology Inc.).

prior to measurement of the sample, measurement was performed on a reference sample (pitch: 10 μm, level difference: 100 nm) to confirm that the measurement errors on the X and Y axes of the apparatus were 5% or less for 10 μm, and that the measurement error on the Z axis was 5% or less for 100 nm.

The size of the observed area of the sample was 2 μm×2 μm, and measurement frequency was 1.0 Hz. The scan line number was 512 on the X axis, and 512 on the Y axis. The measurement was performed in an atmospheric environment at a temperature of 25° C.±2° C. and humidity of 30±5%. The obtained measurement data were analyzed by data processing software supplied with the apparatus to determine the average surface roughness Ra. More specifically, the average surface roughness Ra was obtained by selecting the [3-D Tilt Correction] command in the [Tool] menu of the measurement software of the apparatus to correct tilt and overall tilt of large waviness of the film, and then selecting the [Surface Roughness Analysis] command in the [Analysis] menu. The average surface roughness Ra is defined as follows.

Average surface roughness Ra: the average value of the absolute values of the deviation from the base surface to the specified surface.

$$Ra = \frac{1}{S_0} \int_X \int_Y |F(X, Y) - Z_0| \, dX \, dY \qquad \text{[Mathematical Formula 1]}$$

wherein F(X,Y) is a height value at coordinate (X,Y). $Z_0$ is the average value of Z data defined by Mathematical Formula 2:

$$Z_0 = \frac{1}{S_0} \int_X \int_Y F(X, Y) \, dX \, dY \qquad \text{[Mathematical Formula 2]}$$

wherein $S_0$ is the dimension of the measurement area.

The average surface roughness Ra was measured at ten different locations on both sides (conveniently referred to as "A side" and "B side") of the molded article (film).

The average value of the average surface roughness Ra at the ten locations was used as the roughness of the molded article surface.

Further, the average surface roughness Ra was measured at ten different locations on the metal-deposited surface of the composite. The average value of the average surface roughness Ra at the ten locations was used as the roughness of the composite surface.

3-D tilt correction was performed by fitting the measured sample surface on a 3-D curved surface using least mean square approximation in order to eliminate influence of tilt and waviness of the sample.

(2) Handleability of Film (A) Film-Formation Simultaneous Trimming Performance of Film Using a single-screw extruder (GT-40; manufactured by PLABOR Co., Ltd.), a film-like molded article was extruded through a 500-mm wide T-die. Before rewinding the film, the film was trimmed by bringing a single edge razor blade Feather S (model number: FAS-10; manufactured by Feather Safety Razor Co., Ltd.) into contact with the film at a distance of 5 cm from both ends in parallel with the MD direction of the film and at an angle of 60° with respect to the surface direction of the film. Then, film-formation simultaneous trimming performance was measured. The evaluation criteria were as follows. The film was linearly cut, and no cracks were formed except for the MD direction of the film over two hours: ○; although the film was linearly cut, at least one crack was formed except for the MD direction of the film within two hours: Δ; and the film was not linearly cut: x.

(B) Cuttability of Film

Attaching a super dumbbell cutter (manufactured by Dumbbell Co., Ltd.) to a SDL-200 type lever controlled sample cutter (manufactured by Dumbbell Co., Ltd.), a film was placed on a cushion paper (size: 160 mm×200 mm×3 mm; manufactured by Dumbbell Co., Ltd.), and 1A-type dumbbell specimens, described in JIS K7162, were cut 10 times from the film. Then, cuttability of the film was evaluated according to the following criteria. No cracks other than those in the shape of 1A-type dumbbell were formed during 10-time cutting operations: ○, at least one crack those in the shape of 1A-type dumbbell was formed: Δ, and cracks other than those in the shape of 1A-type dumbbell were formed in each cutting operation: x.

(3) Surface Gloss of Film

The 60° surface gloss of a 100-μm thick film was measured according to JIS K7105.

Example 23

Using GT-40 (manufactured by PLABOR Co., Ltd.), the pellets produced in EXAMPLE 2 were extrusion-molded through a 500-mm wide T-die, and sandwiched between two metallic mirror-finished rolls adjusted to a temperature of 90° C., just under the T-die at a pressing pressure of 50 N/mm. Thus, a 100-μm thick film was obtained. Table 7 shows the surface roughness (conveniently expressed as "A side" and "B side"; the same applies hereinafter), haze, surface hardness, handleability, and surface gloss of the film.

Examples 24 and 25

Films 100 μm thick were obtained in the same manner as in EXAMPLE 23 except that the pellets obtained in EXAMPLES 12 and 8 were used. Table 7 shows the surfaces roughness, haze, surface hardness, handleability, and surface gloss of the films.

Example 26

A 100-μm thick film was obtained in the same manner as in EXAMPLE 23 except that the film was not sandwiched between two metallic mirror-finished rolls just under the T-die, but the film was brought into contact with only one metallic mirror-finished roll adjusted to a temperature of 90° C., and the other side was exposed to air. Table 7 shows the surfaces roughness, haze, surface hardness, handleability, and surface gloss of the film.

Examples 27 to 30

Films 100 μm thick were obtained in the same manner as in EXAMPLE 26 except that the type of the methacrylic resin and/or polyvinyl acetal resin was changed as shown in Table 7. Table 7 shows the surfaces roughness, haze, surface hardness, handleability, and surface gloss of the films.

[Tab. 7]

TABLE 7

| | Ex. | | | | | | | |
|---|---|---|---|---|---|---|---|---|
| | 23 | 24 | 25 | 26 | 27 | 28 | 29 | 30 |
| Methacrylic resin (parts) | | | | | | | | |
| A-1 | 75 | — | — | 75 | — | — | — | — |
| A-7 | — | 75 | — | — | 75 | — | 75 | 75 |
| A-2 | — | — | 75 | — | — | 75 | — | — |

TABLE 7-continued

| | Ex. | | | | | | | |
|---|---|---|---|---|---|---|---|---|
| | 23 | 24 | 25 | 26 | 27 | 28 | 29 | 30 |
| Polyvinyl acetal resin (parts) | | | | | | | | |
| B-1 | 25 | 25 | 25 | 25 | 25 | 25 | — | — |
| B-2 | — | — | — | — | — | — | 25 | — |
| B-3 | — | — | — | — | — | — | — | 25 |
| Surface roughness of film | | | | | | | | |
| A side (nm) | 0.8 | 0.7 | 0.9 | 1.4 | 1.5 | 1.2 | 1.4 | 1.3 |
| B side (nm) | 0.7 | 0.8 | 0.8 | 3.1 | 4.2 | 3.7 | 4.5 | 4.7 |
| Haze of film (%) | 0.1 | 0.1 | 0.1 | 0.4 | 0.4 | 0.5 | 0.4 | 0.9 |
| Surface hardness of film [pencil hardness] | H | 2H | H | H | H | H | H | F |
| Handleability of film | | | | | | | | |
| Film-forming simultaneous trimming performance | ○ | ○ | Δ | ○ | ○ | Δ | ○ | ○ |
| Cuttability | ○ | ○ | Δ | ○ | ○ | Δ | ○ | ○ |
| Surface gloss of film (%) | 155 | 154 | 155 | 148 | 148 | 145 | 140 | 140 |

Comparative Example 15

A 100-μm thick film was obtained using only the methacrylic resin (A-1) in the following manner. Using GT-40 (manufactured by PLABOR Co., Ltd.), the resin was extrusion-molded through a 500-mm wide T-die, and sandwiched between two metallic mirror-finished rolls adjusted to a temperature of 90° C., just under the T-die at a pressing pressure of 50 N/mm. Table 8 shows the surfaces roughness, haze, surface hardness, handleability, and surface gloss of the film.

Comparative Example 16

A 100-μm thick film was obtained in the same manner as in COMPARATIVE EXAMPLE 15 except that only the methacrylic resin (A-7) was used. Table 8 shows the surfaces roughness, haze, surface hardness, handleability, and surface gloss of the film.

Comparative Example 17

A film was intended to be produced in the same manner as in COMPARATIVE EXAMPLE 15 except that only the methacrylic resin (A-2) was used; however, the resin was extremely brittle, and therefore no film-like molded article was obtained.

Comparative Example 18

According to EXAMPLE 23 of Japanese Examined Patent Publication No. 55-27576 (=U.S. Pat. No. 3,793,402), spherical three layer core-shell particles (C-1) having an average particle size of 280 nm were prepared. In the particles, the innermost layer was composed of a cross-linked polymer obtained by polymerizing methyl methacrylate and a small amount of allyl methacrylate; the intermediate layer was composed of a soft elastic copolymer obtained by polymerizing butyl acrylate as main component, styrene and allyl methacrylate; and the outermost layer was composed of a hard polymer obtained by polymerizing methyl methacrylate and a small amount of ethyl acrylate. With 75 parts of the methacrylic resin (A-1), 25 parts of the three-layer core-shell particles were mixed. And the mixture was kneaded by a twin-screw kneading extruder (TEX-44α (L/D=40); manufactured by The Japan Steel Works, Ltd.) to obtain pellets. Then, using GT-40 (manufactured by PLABOR Co., Ltd.), the obtained pellets were extrusion-molded through a 500-mm wide T-die, and sandwiched between two metallic mirror-finished rolls adjusted to a temperature of 90° C., just under the T-die at a pressing pressure of 50 N/mm. Thus, a 100-μm thick film was obtained. Table 8 shows the surfaces roughness, haze, surface hardness, handleability, and surface gloss of the film.

Comparative Example 19

Without forming the innermost layer of the three-layer core-shell particles of COMPARATIVE EXAMPLE 18, spherical two-layer core-shell particles (C-2) having an average particle size of 280 nm were prepared. In the particles, the inner layer was composed of a soft elastic copolymer obtained by polymerizing butyl acrylate as main component, styrene and allyl methacrylate; and the outer layer was composed of a hard polymer obtained by polymerizing methyl methacrylate and a small amount of ethyl acrylate. Then, 25 parts of the two-layer core-shell particles were mixed with 75 parts of the methacrylic resin (A-1), and the mixture was kneaded by a twin-screw kneading extruder (TEX-44α (L/D=40); manufactured by The Japan Steel Works, Ltd.) to obtain pellets. Then, using GT-40 (manufactured by PLABOR Co., Ltd.), the obtained pellets were extrusion-molded through a 500-mm wide T-die, and sandwiched between two metallic mirror-finished rolls adjusted to a temperature of 90° C., just under the T-die at a pressing pressure of 50 N/mm. Thus, a 100-μm thick film was obtained. Table 8 shows the surface roughness, haze, surface hardness, handleability, and surface gloss of the film.

Comparative Example 20

A 100-μm thick film was obtained in the same manner as in COMPARATIVE EXAMPLE 18 except that the film was not sandwiched between two metallic mirror-finished rolls just under the T-die, but the film was brought into contact with only one metallic mirror-finished roll adjusted to a temperature of 90° C., and the other side was exposed to air. Table 8 shows the surface roughness, haze, surface hardness, handleability, and surface gloss of the film.

Comparative Example 21

A 100-μm thick film was obtained in the same manner as in COMPARATIVE EXAMPLE 19 except that the film was not sandwiched between two metallic mirror-finished rolls just under the T-die, but the film was brought into contact with only one metallic mirror-finished roll adjusted to a temperature of 90° C., and the other side was exposed to air. Table 8 shows the surface roughness, haze, surface hardness, handleability, and surface gloss of the film.

[Tab. 8]

TABLE 8

|  | Comp. Ex. | | | | | | |
| --- | --- | --- | --- | --- | --- | --- | --- |
|  | 15 | 16 | 17 | 18 | 19 | 20 | 21 |
| Methacrylic resin (parts) | | | | | | | |
| A-1 | 100 | — | — | 75 | 75 | 75 | 75 |
| A-7 | — | 100 | — | — | — | — | — |
| A-2 | — | — | 100 | — | — | — | — |
| Core-shell particles (parts) | | | | | | | |
| C-1 (3-layer) | — | — | — | 25 | — | 25 | — |
| C-2 (2-layer) | — | — | — | — | 25 | — | 25 |
| Surface roughness of film | | | | | | | |
| A side (nm) | 0.9 | 0.7 | No film obtained | 1.9 | 1.8 | 4.2 | 3.5 |
| B side (nm) | 0.8 | 0.8 | | 3.9 | 3.2 | 9.3 | 7.6 |
| Haze of film (%) | 0.1 | 0.1 | | 0.6 | 0.7 | 1.5 | 1.9 |
| Surface hardness of film [pencil hardness] | H | 2H | | F | HB | F | HB |
| Handleability of film | | | | | | | |
| Film-forming simultaneous trimming performance | X | X | | ○ | ○ | ○ | ○ |
| Cuttability | X | X | | Δ | Δ | Δ | Δ |
| Surface gloss of film (%) | 154 | 155 | | 135 | 138 | 106 | 113 |

As shown in Tables 7 and 8, the films of COMPARATIVE EXAMPLES 18 and 19 using core-shell particles have high roughness as high as about 2.7 nm on average of both sides and low gloss, despite the contact of the both sides with the mirror-finished rolls. On the other hand, the films of EXAMPLES 23 to 25 according to the present invention have very low roughness as low as about 0.9 nm on average of both sides, due to the contact of the both sides with the mirror-finished rolls. In addition, the surface gloss is high and the haze is small. These results revealed that the acrylic resin film in the present invention achieves unprecedented balance because the surface smoothness and haze of the acrylic resin film are equivalent to those of films composed only of a methacrylic resin, and also the handleability of the film such as film-forming simultaneous trimming performance and cuttability, which could not be accomplished by films composed only of a methacrylic resin, is improved.

The properties of the acrylic resin composite were evaluated in the following manner.

(1) Handleability (A) Cuttability of Composite

Attaching a super round-shaped cutter (type: SDRK-1000-D; manufactured by Dumbbell Co., Ltd.) to a SDL-200 type lever controlled sample cutter (manufactured by Dumbbell Co., Ltd.), a composite having a metal and/or metal oxide layer on one side was placed on a cushion paper (size: 160 mm×200 mm×3 mm; manufactured by Dumbbell Co., Ltd.), and 25.12-mm diameter circular specimens were cut 10 times from the composite. Then, the cuttability of the composite was evaluated according to the following criteria. No cracks other than those in the shape of the circular specimen were formed during 10-time cutting operations: ○; at least one crack other than those in the shape of the circular specimen was formed: Δ; and cracks other than those in the shape of the circular specimen were formed in each cutting operation: x.

(2) Specular Gloss of Composite Having Metal and/or Metal Oxide Layer

The 60° specular gloss was measured according to Method 3 of JIS Z8741.

(3) Presence or Absence of Area Deposited with No Aluminum (Deficit) in Composite Having Metal and/or Metal Oxide Layer The aluminum deposited side of the composite was visually observed and evaluated according to the following criteria. Areas deposited with no aluminum (deficit) were observed: x; and no area deposited with no aluminum (deficit) was observed: ○.

(4) Surface Hardness of Composite

The pencil hardness of the surface of the composite opposite to the surface on which a metal and/or metal oxide layer was formed (B side of the film) was measured according to JIS K5400.

Example 31

Using GT-40 (manufactured by PLABOR Co., Ltd.), the pellets produced in EXAMPLE 2 were extrusion-molded through a 500-mm wide T-die, and sandwiched between two metallic mirror-finished rolls adjusted to a temperature of 90° C., just under the T-die at a pressing pressure of 50 N/mm. Thus, a 100-μm thick film was obtained. Table 9 shows the roughness of the surfaces (conveniently the surface with a smaller roughness is expressed as "A side", and the other surface with a larger roughness as "B side"; the same applies hereinafter) of the film.

The A side of the film was subjected to corona discharge treatment, and then aluminum was deposited on the A side by vacuum deposition. The thickness of the aluminum layer was 30 nm. The roughness of the deposited surface, handleability (cuttability of the composite), 60° specular gloss, presence or absence of deficits, surface hardness and of the obtained composite were evaluated. Table 9 shows the results.

[Tab. 9]

TABLE 9

|  | Ex. | | | | | | | | Comp. Ex. |
| --- | --- | --- | --- | --- | --- | --- | --- | --- | --- |
|  | 31 | 32 | 33 | 34 | 35 | 36 | 37 | 38 | 22 |
| Methacrylic resin (parts) | | | | | | | | | |
| A-1 | 75 | 75 | 75 | — | 75 | 75 | 90 | 60 | 100 |
| A-7 | — | — | — | 75 | — | — | — | — | — |

TABLE 9-continued

|  | Ex. | | | | | | | | Comp. Ex. |
| --- | --- | --- | --- | --- | --- | --- | --- | --- | --- |
|  | 31 | 32 | 33 | 34 | 35 | 36 | 37 | 38 | 22 |
| Polyvinyl acetal resin (parts) | | | | | | | | | |
| B-1 | 25 | 25 | 25 | 25 | — | — | 10 | 40 | — |
| B-2 | — | — | — | — | 25 | — | — | — | — |
| B-3 | — | — | — | — | — | 25 | — | — | — |
| Surface roughness of molded article | | | | | | | | | |
| A side (nm) | 0.7 | 1.5 | 0.7 | 0.6 | 0.8 | 0.8 | 0.7 | 0.8 | 0.7 |
| B side (nm) | 0.8 | 4.2 | 0.8 | 0.8 | 0.9 | 0.9 | 0.7 | 1.0 | 0.8 |
| Surface roughness of composite | | | | | | | | | |
| Metal deposited side (nm) | 0.8 | 1.8 | 0.9 | 0.6 | 0.8 | 0.8 | 0.7 | 0.9 | 0.8 |
| Handleability of composite | | | | | | | | | |
| Cuttability | ◯ | ◯ | ◯ | ◯ | ◯ | Δ | Δ | ◯ | X |
| Specular gloss of composite (%) | 950 | 920 | 910 | 960 | 940 | 930 | 950 | 930 | 950 |
| Presence or absence of deficit | ◯ | ◯ | ◯ | ◯ | ◯ | ◯ | ◯ | ◯ | ◯ |
| Surface hardness [pencil hardness] | H | H | H | 2H | H | H | H | H | H |

Example 32

A 100-μm thick film was obtained in the same manner as in EXAMPLE 31 except that the film was not sandwiched between two metallic mirror-finished rolls just under the T-die, but the film was brought into contact with only one metallic mirror-finished roll adjusted to a temperature of 90° C., and the other side was exposed to air. Table 9 shows the roughness of the surfaces of the film. Subsequently, the A side of the film was subjected to corona discharge treatment, and then aluminum was deposited on the A side by vacuum deposition. The thickness of the aluminum layer was 30 nm. The roughness of the deposited surface, handleability (cuttability of the composite), 60° specular gloss, presence or absence of deficits, surface hardness and of the obtained composite were evaluated. Table 9 shows the results.

Example 33

A composite was obtained in the same manner as in EXAMPLE 31 except that the thickness of the aluminum layer was 10 nm. The roughness of the deposited surface, handleability (cuttability of the composite), 600 specular gloss, presence or absence of deficits, and surface hardness of the composite were evaluated. Table 9 shows the results.

Example 34

Using GT-40 (manufactured by PLABOR Co., Ltd.), the pellets produced in EXAMPLE 12 were extrusion-molded through a 500-mm wide T-die, and sandwiched between two metallic mirror-finished rolls adjusted to a temperature of 90° C., just under the T-die at a pressing pressure of 50 N/mm. Thus, a 2-mm thick plate-like molded article was obtained. Table 9 shows the roughness of the surfaces (conveniently the surface with a smaller roughness is expressed as "A side", and the other surface with a larger roughness as "B side"; the same applies hereinafter) of the molded article. Subsequently, the A side of the plate-like molded article was subjected to corona discharge treatment, and then aluminum was deposited on the A side by vacuum deposition. The thickness of the aluminum layer was 30 nm. The roughness, handleability (cuttability of the composite), 600 specular gloss, presence or absence of deficits, surface hardness and of the obtained composite were evaluated. Table 9 shows the results.

Example 35

A composite was obtained in the same manner as in EXAMPLE 31 except that the pellets obtained in EXAMPLE 4 were used. The roughness, handleability (cuttability of the composite), 60° specular gloss, presence or absence of deficits, surface hardness and of this laminated plate were evaluated. Table 9 shows the results.

Example 36

A composite was obtained in the same manner as in EXAMPLE 31 except that the pellets obtained in EXAMPLE 5 were used. The roughness, handleability (cuttability of the composite), 60° specular gloss, presence or absence of deficits, surface hardness and of this laminated plate were evaluated. Table 9 shows the results.

Examples 37 and 38

Composites were obtained in the same manner as in EXAMPLE 31 except that the pellets obtained in EXAMPLE 1 and EXAMPLE 3 were used. The roughness, handleability (cuttability of the composite), 60° specular gloss, presence or absence of deficits, surface hardness and of these laminated plates were evaluated. Table 9 shows the results.

Comparative Example 22

A 100-μm thick film was obtained using only the methacrylic resin (A-1) in the following manner. Using GT-40

(manufactured by PLABOR Co., Ltd.), the resin was extrusion-molded through a 500-mm wide T-die, and sandwiched between two metallic mirror-finished rolls adjusted to a temperature of 90° C., just under the T-die at a pressing pressure of 50 N/mm. Table 9 shows the surfaces roughness of the film. Subsequently, the A side of the film was subjected to corona discharge treatment, and then aluminum was deposited on the A side by vacuum deposition. The thickness of the aluminum layer was 30 nm. The roughness of the deposited surface, handleability (cuttability of the composite), 60° specular gloss, presence or absence of deficits, surface hardness and of the obtained composite were evaluated. Table 9 shows the results.

As shown in Table 9, the composite obtained by forming a metal film on the molded article prepared by using the materials in which the mass ratio of the methacrylic resin (A) to the polyvinyl acetal resin (B) was outside the range of 99/1 to 51/49 (COMPARATIVE EXAMPLE 22) has inferior handleability. In contrast, the composites produced in accordance with the present invention (EXAMPLES) have excellent handleability, as well as higher specular gloss and surface hardness.

The invention claimed is:

1. An acrylic resin film comprising,
an acrylic thermoplastic resin composition, comprising:
a methacrylic resin (A); and
a polyvinyl acetal resin (B),
wherein
the methacrylic resin (A) has a weight average molecular weight of 40,000 or more,
a methyl methacrylate unit content in the methacrylic resin (A) is 80 to 99.9% by mass,
an alkyl acrylate unit in the methacrylic resin (A) is 0.1 to 20% by mass,
at least the methacrylic resin (A) forms a continuous phase, and among glass transition temperatures of the acrylic thermoplastic resin composition, a glass transition temperature, $Tg_{AP}$, ascribed to the methacrylic resin (A) indicates a value between a glass transition temperature, $Tg_A$, of the methacrylic resin (A) alone and a glass transition temperature, $Tg_B$, of the polyvinyl acetal resin (B) alone, and
wherein a mass ratio, (A)/(B), of the methacrylic resin (A) to the polyvinyl acetal resin (B), is 99/1 to 51/49.

2. The film of claim 1, wherein the mass ratio (A)/(B) of the methacrylic resin (A) to the polyvinyl acetal resin (B) is 95/5 to 60/40.

3. The film of claim 1, wherein the polyvinyl acetal resin (B) has an acetalization degree of 55 to 83 mol %.

4. The film of claim 1, wherein at least one selected from the group consisting of
a flexural modulus measured according to JIS K7171 with a specimen 80 mm long×10 mm wide×4 mm thick at a strain rate of 1 mm/min., and
an elongation modulus measured according to JIS K7162 with a 1A-type dumbbell specimen at a strain rate of 1 mm/min.,
is not less than 2 GPa.

5. The film of claim 1, having a haze, measured according to JIS K7136, of 0.3% or less.

6. The film of claim 1, wherein the acrylic thermoplastic resin composition further comprises an ultraviolet absorber, present in an amount of 0.1 to 10% by mass relative to the total mass of the acrylic thermoplastic resin composition.

7. The film of claim 1, wherein the methacrylic resin (A) comprises alkyl acrylate monomer units in an amount of from 0.1 to 20% by mass, relative to the mass of the methacrylic resin (A).

8. The film of claim 1, wherein the polyvinyl acetal resin (B) comprises vinyl alcohol monomer units in an amount of from 17 to 45 mol % and vinyl acetate units in an amount of from 0 to 5 mol %.

9. The film of claim 1, wherein the alkyl acrylate has 1 to 8 carbon atoms in the alkyl group.

10. The film of claim 1, wherein the polyvinyl acetal resin (B) is obtained by (co-)acetalizing a polyvinyl alcohol resin having a number average polymerization degree of 200 to 4,000.

11. The film of claim 1, wherein the polyvinyl acetal resin (B) is obtained by (co-)acetalizing a polyvinyl alcohol resin having a saponification degree of 80 mol % or more.

12. The film of claim 1, wherein the polyvinyl acetal resin (B) is polyvinyl butyral.

13. The film of claim 1, wherein the polyvinyl acetal resin (B) is polyvinyl butyral having a butyralization degree of 55 to 75 mol %.

14. An acrylic resin film, comprising:
the film of claim 1; and
at least one other thermoplastic resin layer present on at least one side of the film.

15. A method of producing the film of claim 1, comprising:
melt-kneading the methacrylic resin (A), which is a resin having a weight average molecular weight of 40000 or more, and the polyvinyl acetal resin (B), which is a resin having an acetalization degree of 55 to 83 mol % obtained by (co-)acetalizing a polyvinyl alcohol resin having a number average polymerization degree of 200 to 4000, at a mass ratio (A)/(B) of 99/1 to 51/49, to obtain a kneaded product;
extruding the kneaded product from a T-die in a molten state, to obtain an extruded product; and
contacting both faces of the extruded product with surface of mirror-finished rolls or mirror-finished belts for shape forming.

16. A laminated body, comprising:
at least one selected from the group consisting of a thermoplastic resin and a thermosetting resin; and
the film of claim 1, present on a surface of the resin.

17. A method of producing a laminated body, comprising:
inserting the film of claim 1 between male and female dies in an injection mold; and
injecting a thermoplastic resin into one side of the film in the injection mold.

18. An acrylic resin composite, comprising:
an acrylic resin film according to claim 1 in the form of a molded article; and
a layer of at least one selected from the group consisting of a metal and a metal oxide present on at least one side of the molded article.

19. The composite of claim 18, wherein a surface of the at least one side of the molded article on which the at least one selected from the group consisting of a metal and a metal oxide layer is present, has a roughness of 1.5 nm or less.

20. The composite of claim 18, further comprising:
a layer of other thermoplastic resin present on one surface of the molded article.

21. A method of producing the composite of claim 18, comprising:
  melt-kneading a methacrylic resin (A) having a weight average molecular weight of 40000 or more, and a polyvinyl acetal resin (B) having an acetalization degree of 55 to 83 mol % obtained by (co-)acetalizing a polyvinyl alcohol resin having a number average polymerization degree of 200 to 4000, at a mass ratio (A)/(B) of 99/1 to 51/49, to obtain a kneaded product;
  extruding the kneaded product from a T-die in a molten state, to obtain an extruded product; and
  contacting both faces of the extruded product with a surface of mirror-finished rolls or mirror-finished belts for shape forming.

22. A laminated body, comprising:
  at least one selected from the group consisting of a thermoplastic resin and a thermosetting resin; and
  the composite of claim 18 present on the surface of the resin.

23. A method of producing a laminated body, comprising:
  inserting the composite of claim 18 between male and female dies in an injection mold; and
  injecting a thermoplastic resin into one side of the composite in the injection mold.

\* \* \* \* \*